US006933461B2

(12) United States Patent
Horner-Richardson et al.

(10) Patent No.: US 6,933,461 B2
(45) Date of Patent: Aug. 23, 2005

(54) TIPS AND CONTACT MEMBERS HAVING RIDGES FOR USE IN A CONTACT START PLASMA ARC TORCH

(75) Inventors: Kevin Horner-Richardson, Cornish, NH (US); David A. Small, Strafford, VT (US); Joseph P. Jones, Lebanon, NH (US); Roger W. Hewitt, Plainfield, NH (US)

(73) Assignee: Thermal Dynamics Corporation, West Lebanon, NH (US)

(*) Notice: Subject to any disclaimer, the term of this patent is extended or adjusted under 35 U.S.C. 154(b) by 0 days.

(21) Appl. No.: 10/245,781

(22) Filed: Sep. 16, 2002

(65) Prior Publication Data

US 2004/0011771 A1 Jan. 22, 2004

Related U.S. Application Data

(63) Continuation-in-part of application No. 10/083,167, filed on Feb. 26, 2002, now Pat. No. 6,774,336, and a continuation-in-part of application No. 09/794,540, filed on Feb. 27, 2001, now Pat. No. 6,703,581.

(51) Int. Cl.[7] ................................................ B23K 10/00

(52) U.S. Cl. ............................ 219/121.48; 219/121.52; 219/121.57; 219/75

(58) Field of Search ......................... 219/121.5, 121.52, 219/121.51, 121.54, 121.57, 121.59, 121.48, 74, 75; 313/231.31, 231.41

(56) References Cited

U.S. PATENT DOCUMENTS

| | | | | | |
|---|---|---|---|---|---|
| 4,916,273 | A | * | 4/1990 | Browning | 219/121.47 |
| 5,164,568 | A | * | 11/1992 | Sanders | 219/121.5 |
| 5,464,961 | A | * | 11/1995 | Lichon | 219/121.52 |
| 5,994,663 | A | * | 11/1999 | Lu | 219/121.51 |
| 6,372,298 | B1 | * | 4/2002 | Marantz et al. | 427/449 |

* cited by examiner

*Primary Examiner*—Mark Paschall
(74) *Attorney, Agent, or Firm*—Harness, Dickey & Pierce, P.L.C.

(57) ABSTRACT

A tip for a plasma arc torch includes a ridge for improved electrical contact with a starting member.

7 Claims, 25 Drawing Sheets

TIPS AND CONTACT MEMBERS HAVING RIDGES FOR USE IN A CONTACT START PLASMA ARC TORCH

CROSS-REFERENCE TO RELATED APPLICATIONS

The present application is a continuation in part of U.S. application Ser. No. 09/794,540, titled "Contact Start Plasma Torch," filed Feb. 27, 2001 now U.S. Pat. No. 6,703,581; and of U.S. patent application Ser. No. 10/083,167, filed Feb. 26, 2002 now U.S. Pat. No. 6,774,336, the disclosures of which are incorporated herein by reference.

FIELD OF THE INVENTION

The present invention relates generally to plasma arc torches and more particularly to devices and methods for generating and stabilizing a plasma stream.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in a tip, or nozzle, of the plasma arc torch. The electrode (which is one among several consumable parts in a plasma arc torch), has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

One of two methods is typically used for initiating the pilot arc between the electrode and the tip. In the first method, commonly referred to as a "high frequency" or "high voltage" start, a high potential is applied across the electrode and the tip sufficient to create an arc in the gap between the electrode and the tip. Accordingly, the first method is also referred to as a "non-contact" start, since the electrode and the tip do not make physical contact to generate the pilot arc. In the second method, commonly referred to as a "contact start," the electrode and the tip are brought into contact and are gradually separated, thereby drawing an arc between the electrode and the tip. The contact start method thus allows an arc to be initiated at much lower potentials since the distance between the electrode and the tip is much smaller.

With either start method, distribution and regulation of the plasma gas utilized for forming the plasma stream is typically provided by a separate element commonly referred to as a gas distributor or a swirl ring. Additionally, a secondary gas for stabilizing the plasma stream is often provided through another separate element or a combination of elements within the plasma arc torch such as passageways through a shield cup or between a shield cup and another consumable component such as a tip. By way of example, a gas distributor such as that described in U.S. Pat. No. 6,163,008, which is hereby incorporated by reference, is primarily responsible for regulating the plasma gas in a gas passage leading to a central exit orifice of the tip. The secondary gas is generally circulated through passages formed between a shield cup insert and the tip, and travels along the tip exterior to stabilize the plasma stream exiting the central exit orifice. Accordingly, several torch elements (i.e., gas distributor, shield cup, and tip) are required to distribute and regulate the plasma gas and the secondary gas.

Many of the consumable components, including the gas distributor, the tip, and the electrode, are often interchanged as a function of an operating current level in order to improve gas flow and form a stable plasma stream. For example, if a power supply is being used that operates at 40 amps, one set of consumable components are installed within the plasma arc torch to optimize cutting performance. On the other hand, if a power supply is being used that operates at 80 amps, another set of consumable components are typically installed to optimize cutting performance for the increased current level. Unfortunately, changing consumable components can be time consuming and cumbersome, and if an operator uses different operating current levels on a regular basis, an increased number of consumable components must be maintained in inventory to facilitate the different current levels.

Accordingly, a need remains in the art for a device and method to simplify operation of a plasma arc torch that operates at different current levels. Further, the device and method should simplify and reduce the amount of time required to change consumable components when operating at different current levels.

SUMMARY OF THE INVENTION

In one preferred form, the present invention provides a tip gas distributor that comprises a plurality of swirl holes and secondary gas holes, wherein the swirl holes direct a plasma gas to generate a plasma stream, and the secondary gas holes direct a secondary gas to stabilize the plasma stream. Accordingly, regulation of the plasma gas and secondary gas is controlled by a single torch component, which further provides a function as a tip, having positive, or anode, potential, in addition to metering the plasma stream during operation.

In another form, a tip gas distributor is provided that comprises a plurality of swirl holes, without any secondary gas holes, to direct a plasma gas to generate a plasma stream. Further, a tip gas distributor is provided that comprises a plurality of secondary gas holes, without any swirl holes, to stabilize the plasma stream. Additionally, tip gas distributors are provided that comprise at least one swirl hole and/or at least one secondary gas hole.

In other forms of the present invention, tip gas distributors are provided that comprise swirl passages and/or secondary gas passages formed between the tip gas distributor and an adjacent component rather than holes formed within the tip gas distributor. Similarly, the swirl passages direct a plasma gas to generate a plasma stream and the secondary gas passages direct a secondary gas to stabilize the plasma stream.

Additionally, methods of directing a plasma gas to generate a plasma stream and directing a secondary gas to stabilize the plasma stream are provided, wherein a source of gas is provided that is distributed through a plasma arc apparatus to generate a plasma gas and a secondary gas. The plasma gas is then directed through at least one swirl hole formed in a tip gas distributor of the plasma arc apparatus and the secondary gas is directed through at least one secondary gas hole formed in the tip gas distributor. Accordingly, the swirl hole directs the plasma gas to generate a plasma stream and the secondary gas hole directs the secondary gas to stabilize the plasma stream that exits the tip gas distributor. Moreover, methods of generating a plasma stream and stabilizing the plasma stream are provided that utilize at least one swirl passage and at least one secondary gas passage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
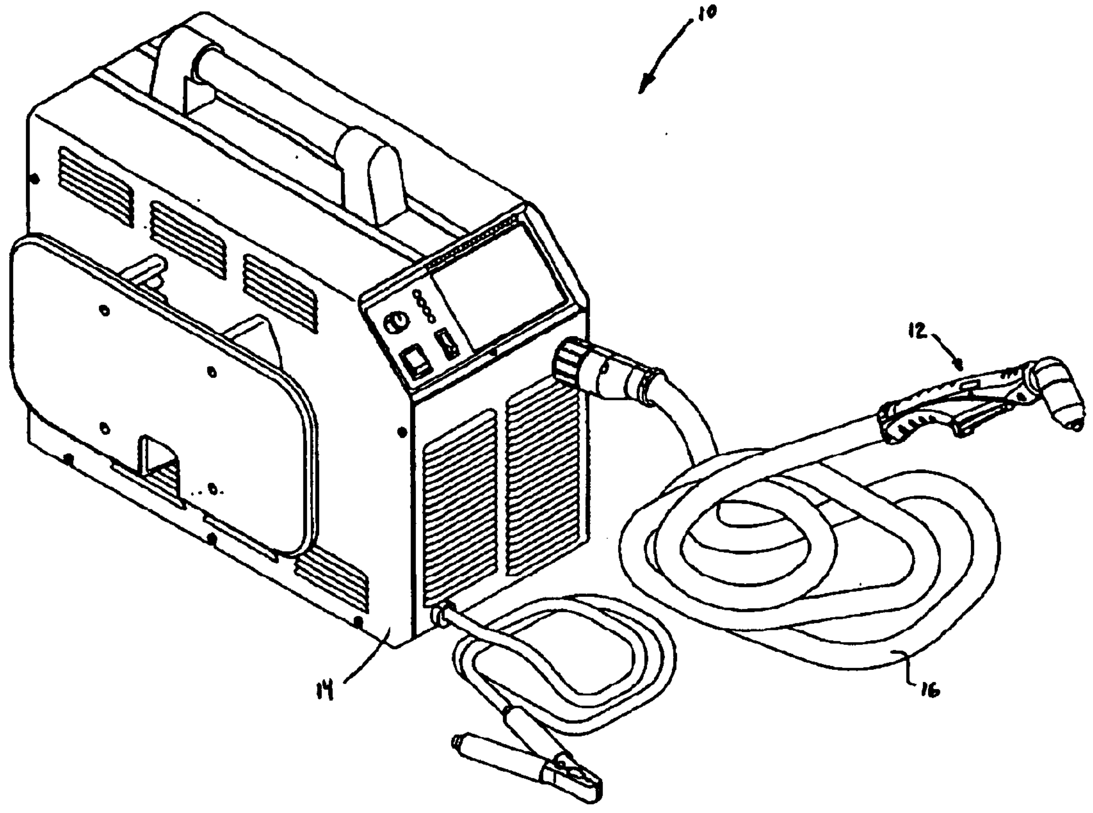
FIG. 1 is a perspective view of a manually operated plasma arc apparatus in accordance with the principles of the present invention.

Referring to the drawings, a tip gas distributor according to the present invention is generally operable with a manually operated plasma arc apparatus as indicated by reference numeral 10 in FIG. 1. Typically, the manually operated plasma arc apparatus 10 comprises a plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12 as described in greater detail below.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

Figure 2:
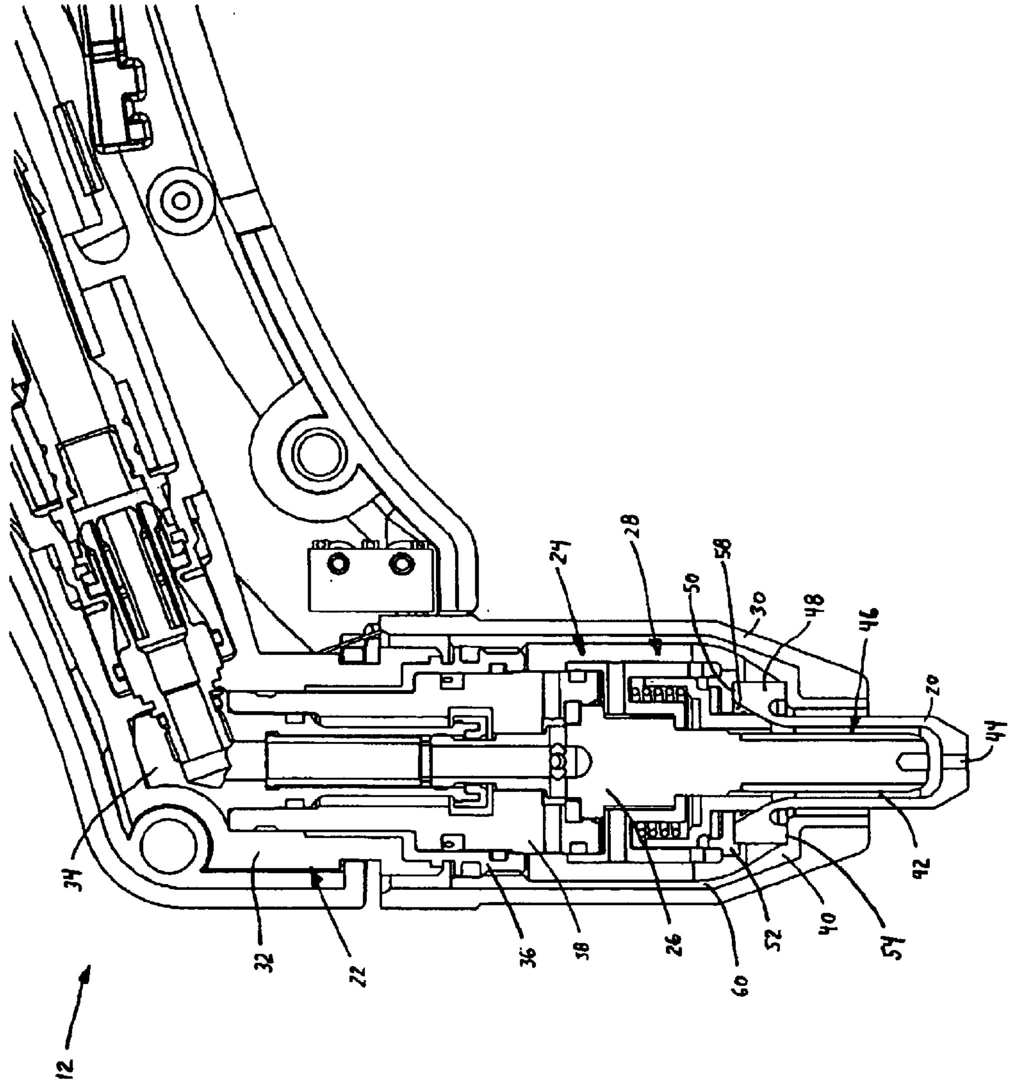
FIG. 2 is a cross-sectional view taken through an exemplary torch head illustrating a tip gas distributor in accordance with the principles of the present invention.
Figure 3:
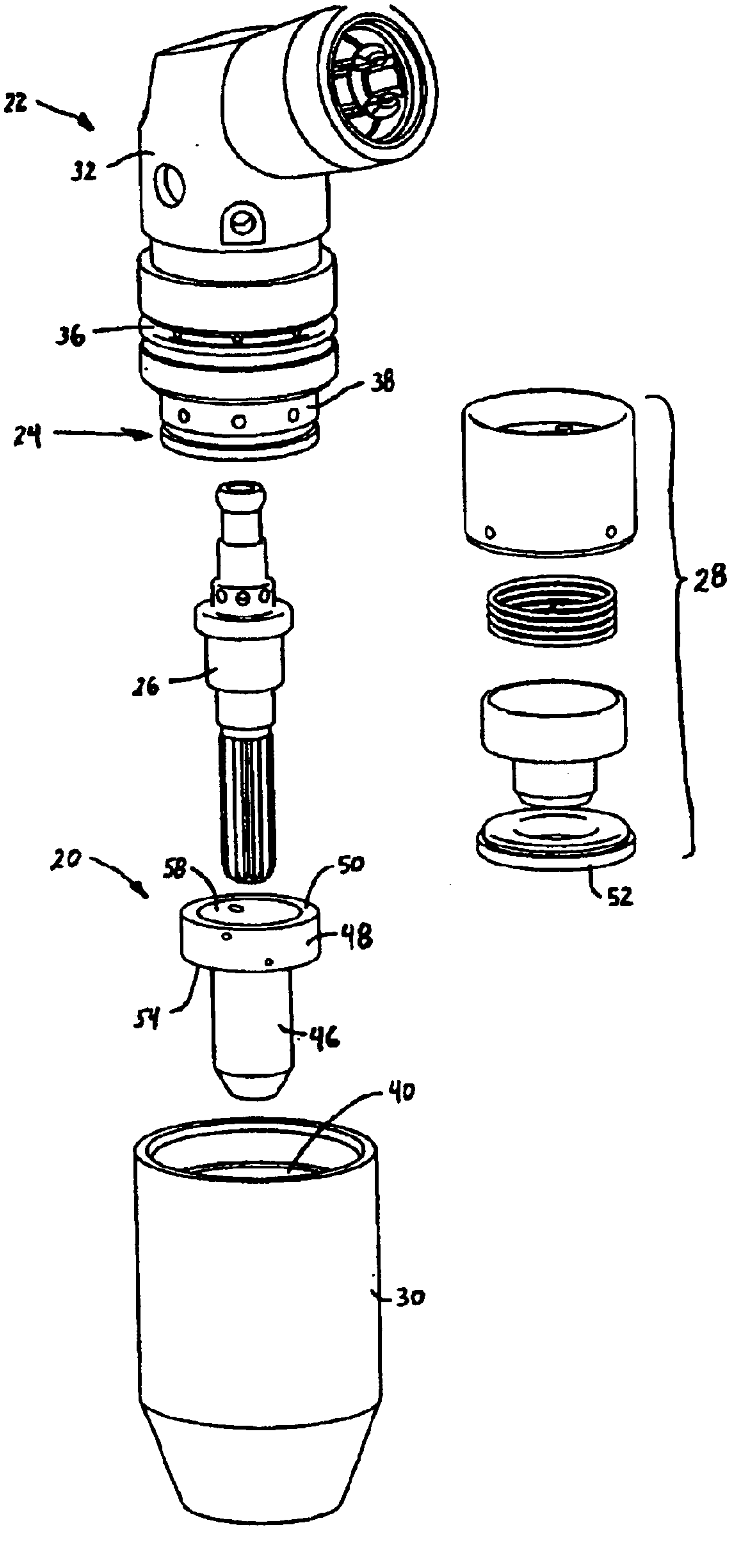
FIG. 3 is an exploded perspective view illustrating a tip gas distributor with other consumable components that are secured to a plasma arc torch head.
Figure 4A:
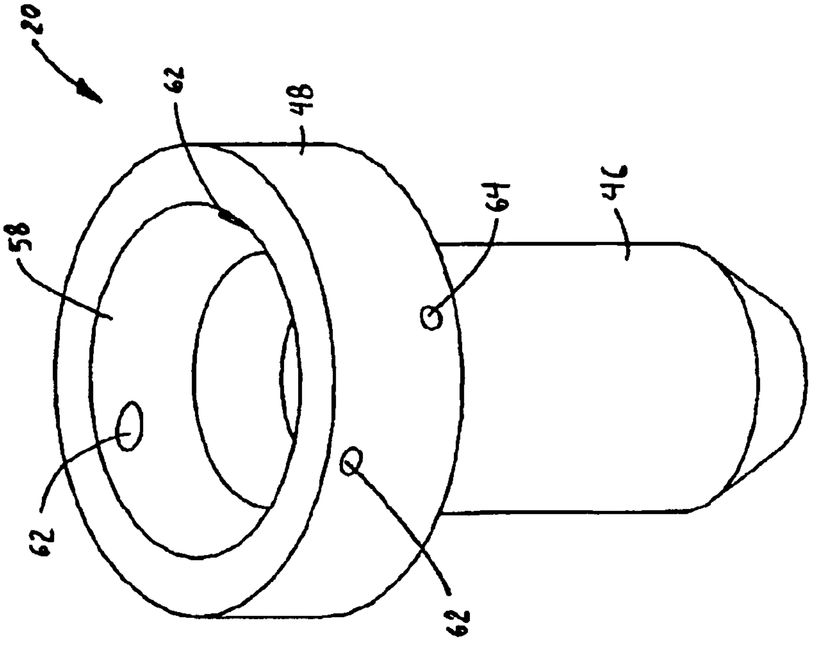
FIG. 4*a* is an upper perspective view of a tip gas distributor constructed in accordance with the principles of the present invention.
Figure 4B:
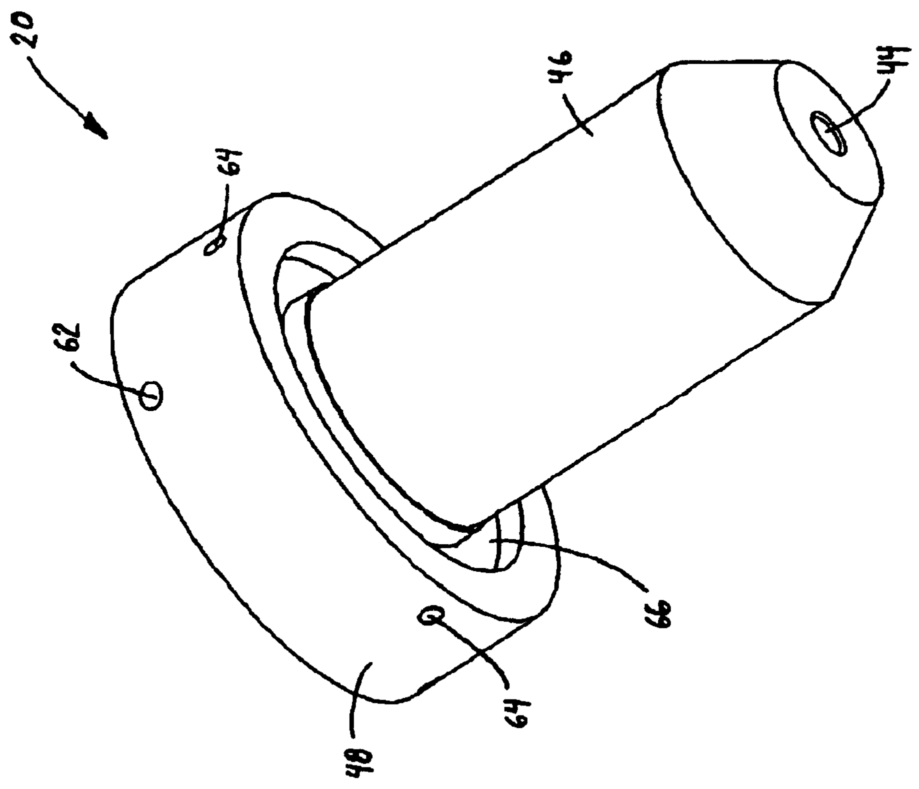
FIG. 4*b* is a lower perspective view of a tip gas distributor constructed in accordance with the principles of the present invention.
Figure 5:
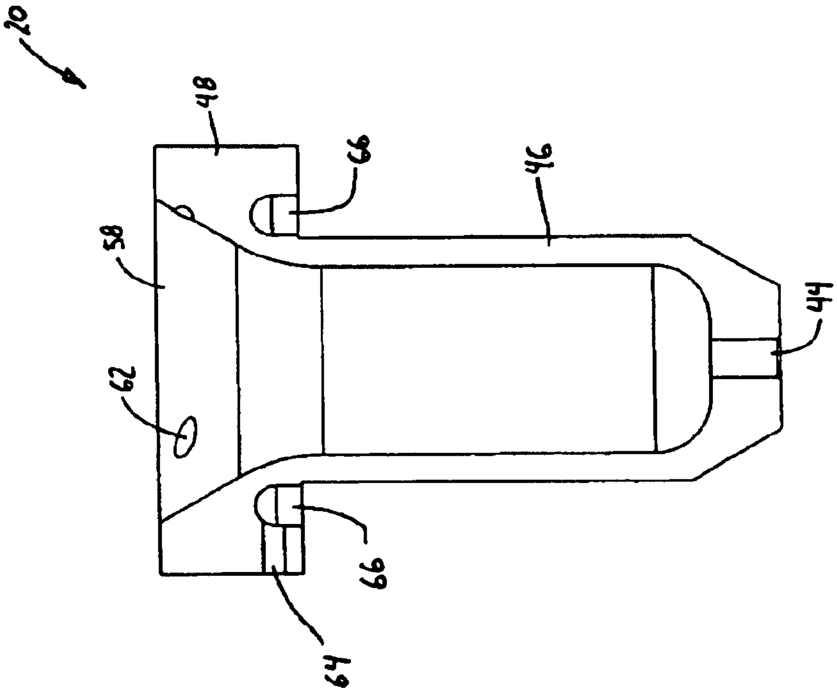
FIG. 5 is a cross-sectional view taken through a tip gas distributor constructed in accordance with the principles of the present invention.

Referring now to FIGS. 2 and 3, a tip gas distributor according to the present invention is illustrated and generally indicated by reference numeral 20 within a torch head 22 of the plasma arc torch 12. The tip gas distributor 20 is one of several consumable components that operate with and that are secured to the torch head 22 during operation of the plasma arc torch 12. As shown, the torch head 22 defines a distal end 24, to which the consumable components are secured, wherein the consumable components further comprise, by way of example, an electrode 26, a start cartridge 28, (which is used to draw a pilot arc as shown and described in co-pending application titled "Contact Start Plasma Arc Torch," filed on Feb. 26, 2002, and commonly assigned with the present application, the contents of which are incorporated herein by reference), and a shield cup 30 that secures the consumable components to the distal end 24 of the torch head 22 and further insulates the consumable components from the surrounding area during operation of the torch. The shield cup 30 also positions and orients the consumable components, e.g., the start cartridge 28 and the tip gas distributor 20, relative to one another for proper operation of the torch when the shield cup 30 is fully engaged with the torch head 22. As used herein, the terms proximal or proximal direction should be construed as meaning towards or in the direction of the power supply 14 (not shown), and the terms distal or distal direction should be construed as meaning towards or in the direction of the tip gas distributor 20.

As further shown, the torch head 22 comprises a housing 32 in which fixed components are disposed. More specifically, the fixed components comprise a cathode 34 that has relatively negative potential, an anode 36 that has relatively positive potential, and an insulating body 38 that insulates the cathode 34 from the anode 36, each of which provides certain gas distribution functions. In operation, the electrode 26 is in electrical contact with the cathode 34 to form the negative side of the power supply, and the tip gas distributor 20 is in electrical contact with the anode 36, more specifically through a shield cup insert 40, to form the positive side of the power supply. Accordingly, the tip gas distributor 20 is a conductive member and is preferably formed of a copper or copper alloy material.

The tip gas distributor 20 is mounted over a distal portion of the electrode 26 and is in a radially and longitudinally spaced relationship with the electrode 26 to form a primary gas passage 42, which is also referred to as an arc chamber or plasma chamber. A central exit orifice 44 of the tip gas distributor 20 communicates with the primary gas passage 42 for exhausting ionized gas in the form of a plasma stream from tip gas distributor 20 and directing the plasma stream down against a workpiece. The tip gas distributor 20 further comprises a hollow, generally cylindrical distal portion 46 and an annular flange 48 at a proximal end. The annular flange 48 defines a generally flat, proximal face 50 that seats against and seals with a tip seat 52 of the start cartridge 28, and a distal face 54 adapted to seat within and make electrical contact with the conductive insert 40 disposed within the shield cup 30. The conductive insert 40 is further adapted for connection with the anode 36, such as through a threaded connection, such that electrical continuity between the positive side of the power supply is maintained.

Additionally, the tip gas distributor 20 preferably defines a conical interior surface 58, which makes electrical contact with a portion of the start cartridge 32 in one form of the present invention. In operation, a working gas is supplied to the tip gas distributor 20 through a primary gas chamber 60 that extends distally from the torch head 22, wherein the working gas is subsequently divided into a plasma gas to generate a plasma stream and a secondary gas to stabilize the plasma stream by the tip gas distributor 20 as set forth in the following.

Figure 6:
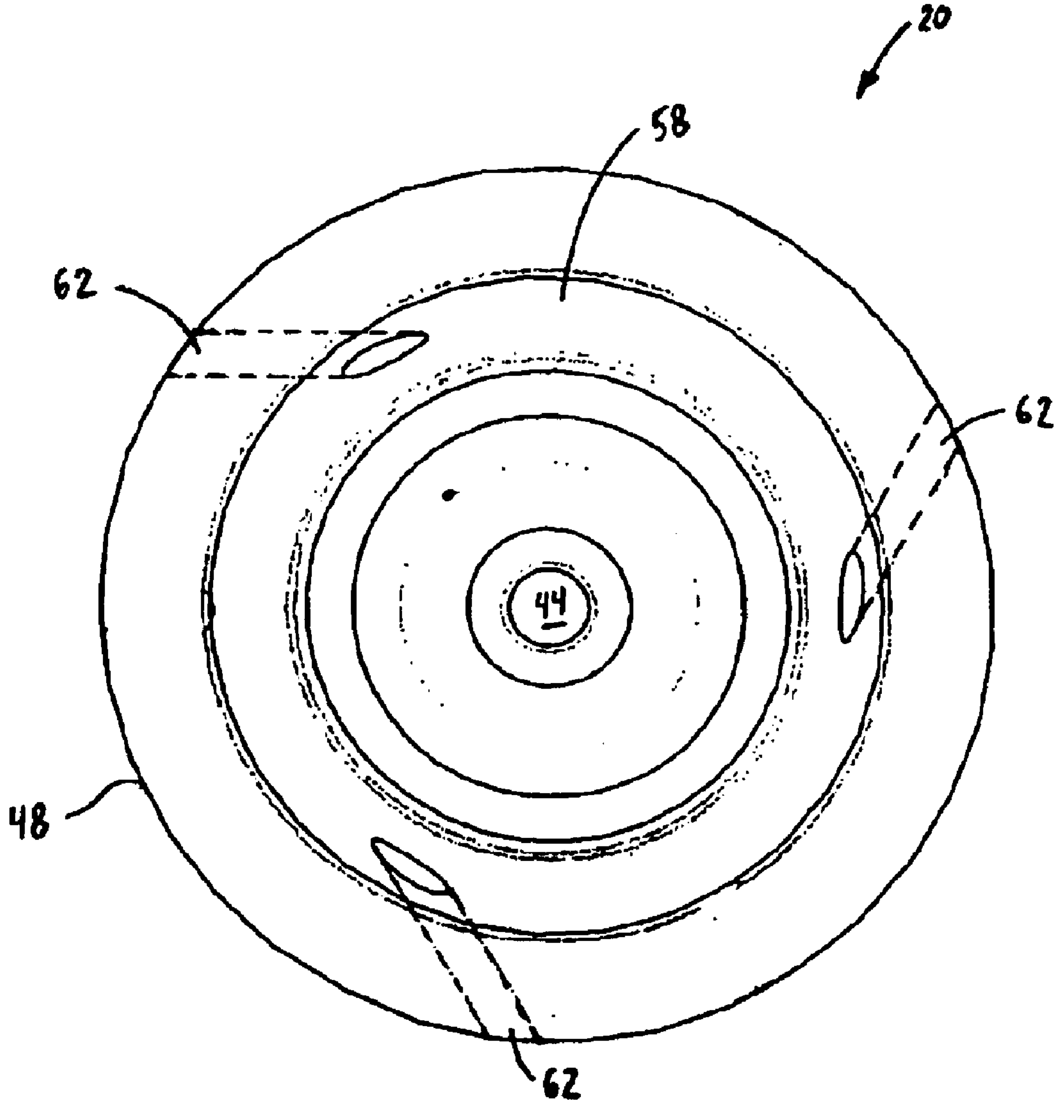
FIG. 6 is a top view of a tip gas distributor illustrating off center swirl holes and constructed in accordance with the principles of the present invention.
Figure 7:
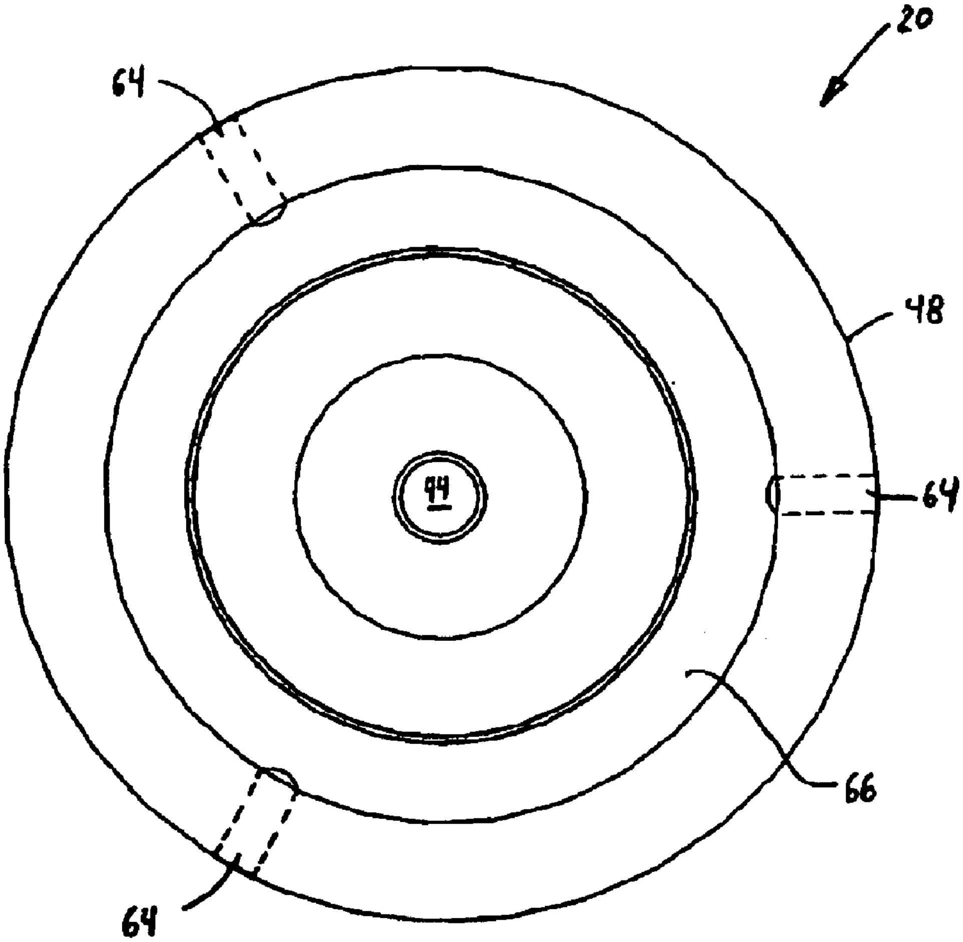
FIG. 7 is a bottom view of a tip gas distributor illustrating secondary gas holes and constructed in accordance with the principles of the present invention.

Referring now to FIGS. 4 through 7, the tip gas distributor 20 further defines a plurality of swirl holes 62 around and through the annular flange 48 and a plurality of secondary gas holes 64 extending radially through the annular flange 48 and into an annular recess 66 on the distal face 54. Preferably, the swirl holes 62 are offset from a center of the tip gas distributor 20 as shown in FIG. 6, such that the plasma gas is introduced into the primary gas passage 44 in a swirling motion, which generates a more robust plasma stream and further cools the electrode 26 (not shown) during operation. Additionally, the secondary gas holes 64 are preferably formed approximately normal through the annular flange 48 as shown more clearly in FIG. 7, such that the secondary gas flows directly into the annular recess 66 and distally along the cylindrical distal portion 46 to stabilize the plasma stream that exits through the central exit orifice 44.

In operation, the working gas flows to the tip gas distributor 20 and is split or divided into the plasma gas and the secondary gas by the swirl holes 62 and the secondary gas holes 64, respectively. The plasma gas flows through the swirl holes 62 and is swirled proximate the conical interior surface 58 to generate the plasma stream. The secondary gas flows through the secondary gas holes 64, into the annular recess 66, and along the cylindrical distal portion 46 to stabilize the plasma stream as the stream exits the central exit orifice 44. Accordingly, the tip gas distributor 20 regulates the plasma gas and the secondary gas, while metering the plasma stream and maintaining the positive, or anode, side of the power supply.

As illustrated, the tip gas distributor 20 in one form comprises three (3) swirl holes 62 and three (3) secondary gas holes 64 spaced evenly around the annular flange 48, which is a preferred configuration for an operating current of approximately 40 amps. However, with different operating currents, a ratio of a flow rate of the plasma stream through the central exit orifice 44 to a flow rate of the secondary gas through the secondary gas holes 64 is preferably adjusted to produce an optimum plasma stream. Accordingly, with a different current level, the size of the central exit orifice 44 and/or the size and number of secondary gas holes 64 are adjusted for the optimum plasma stream, while the swirl holes 62 may be adjusted or may remain constant according to specific flow requirements. Therefore, a different tip gas distributor 20 is preferred for different operating current levels. In operation, therefore, only the tip gas distributor 20 need be changed with different current levels, rather than a plurality of consumable components to achieve the proper flow ratio for an optimum plasma stream.

Figure 8:
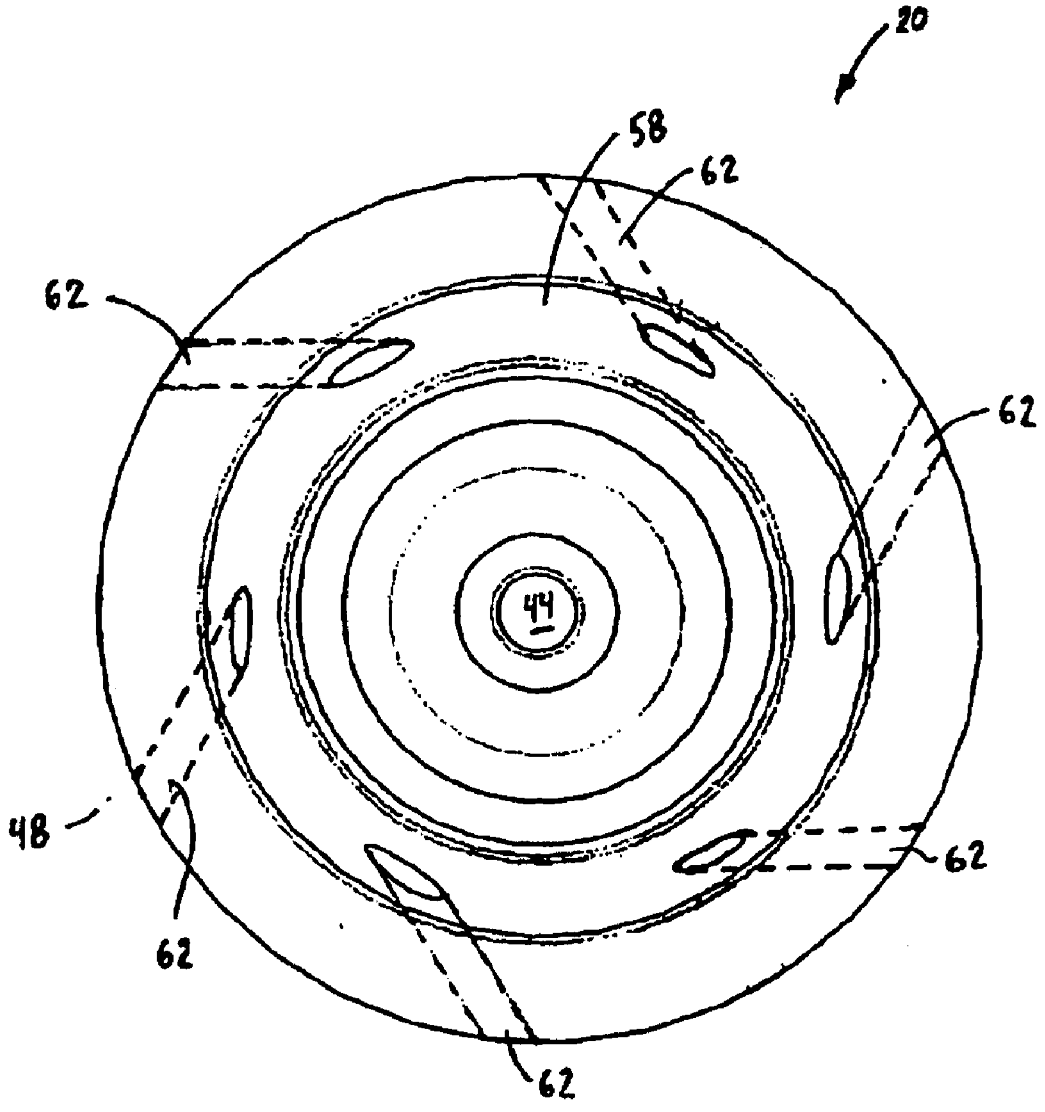
FIG. 8 is a perspective view of a second embodiment of a tip gas distributor constructed in accordance with the principles of the present invention.
Figure 9:
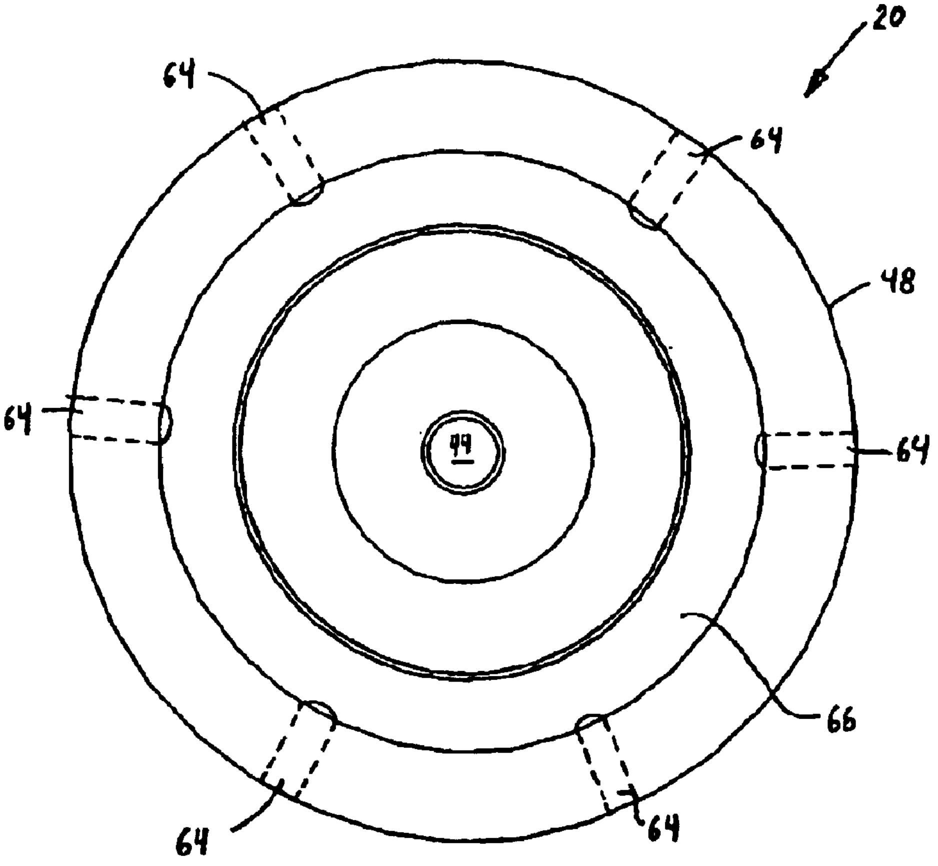
FIG. 9 is a bottom view of the second embodiment of the tip gas distributor, illustrating the size and number of secondary gas holes, in accordance with the principles of the present invention.

For example, at an operating current level of approximately 80 amps, the tip gas distributor 20 preferably defines six (6) swirl holes 62 and six (6) secondary gas holes 64 to optimize the plasma stream as shown in FIGS. 8 and 9. Further, the diameter of the central exit orifice 46 is preferably 0.055 in. (0.140 cm.), which results in a ratio of 1:2 of the plasma stream rate flowing through the central exit orifice 44 to the secondary gas rate flowing through the secondary gas holes 64. Accordingly, preferable tip gas distributor configurations for different operating current levels are listed below in Table I, wherein the preferred number and diameter of secondary gas holes 64 are shown, along with the corresponding central exit orifice 44 diameters, and the corresponding ratio of flow rate through the central exit orifice 46 to the flow rate through the secondary gas holes 64.

TABLE I

| Operating Current | Plasma Orifice Diameter (in.) | Swirl Holes (number) | Secondary Gas Holes (number × dia) | Flow Ratio Plasma:Secondary |
|---|---|---|---|---|
| 40 | 0.033 | 3 | 3 × 0.028 | 1:2 |
| 60 | 0.049 | 3 | 4 × 0.033 | 1:2 |
| 80 | 0.055 | 6 | 6 × 0.033 | 1:2 |

As used herein, the term "hole" may also be construed as being an aperture or opening through the tip gas distributor 20 that allows for the passage of gas flow, such as a slot or other polygonal configuration, or an ellipse, among others. Accordingly, the illustrations of the swirl holes 62 and the secondary gas holes 64 as being circular in shape should not be construed as limiting the scope of the present invention. In addition, the tip gas distributor 20 may comprise at least one swirl hole 62 and/or at least one secondary gas hole 64, among the various forms of the present invention.

Figure 10A:
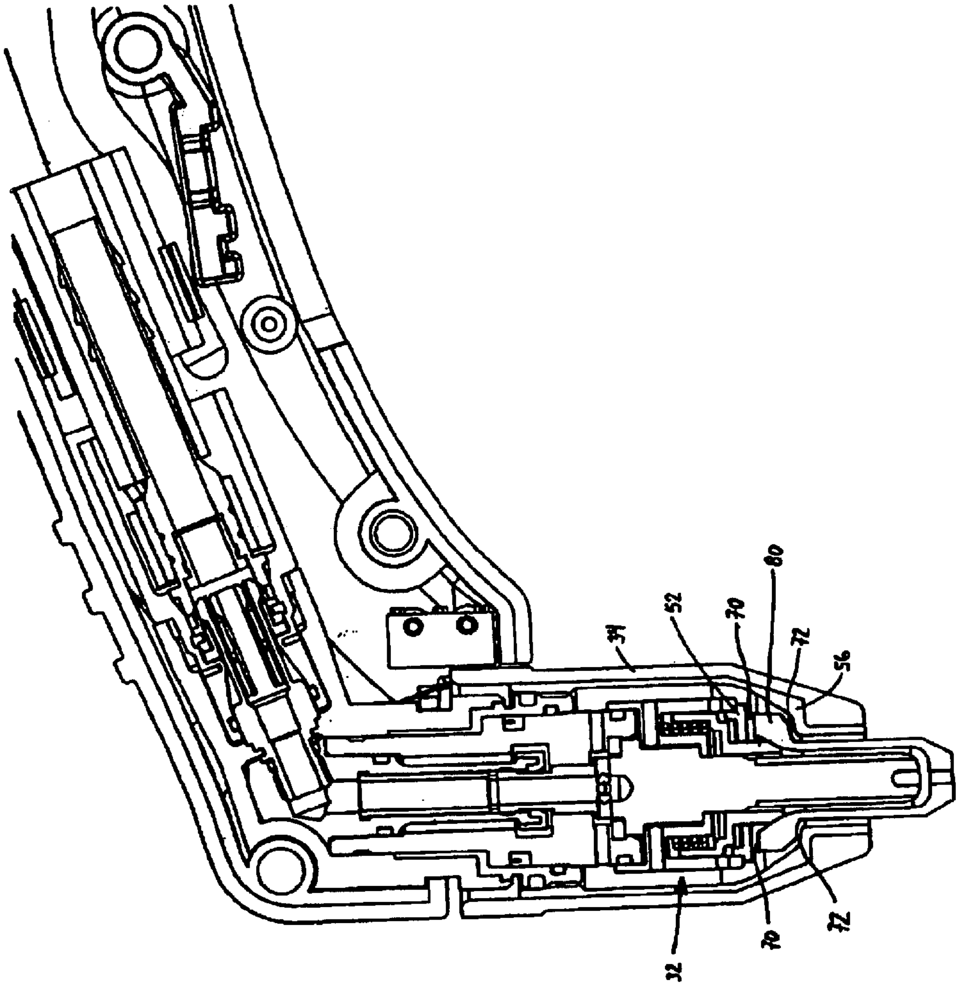
FIG. 10*a* is a cross-sectional view through a third embodiment of a tip gas distributor within a plasma arc torch, illustrating swirl passages and secondary gas passages, and constructed in accordance with the principles of the present invention.
Figure 10B:
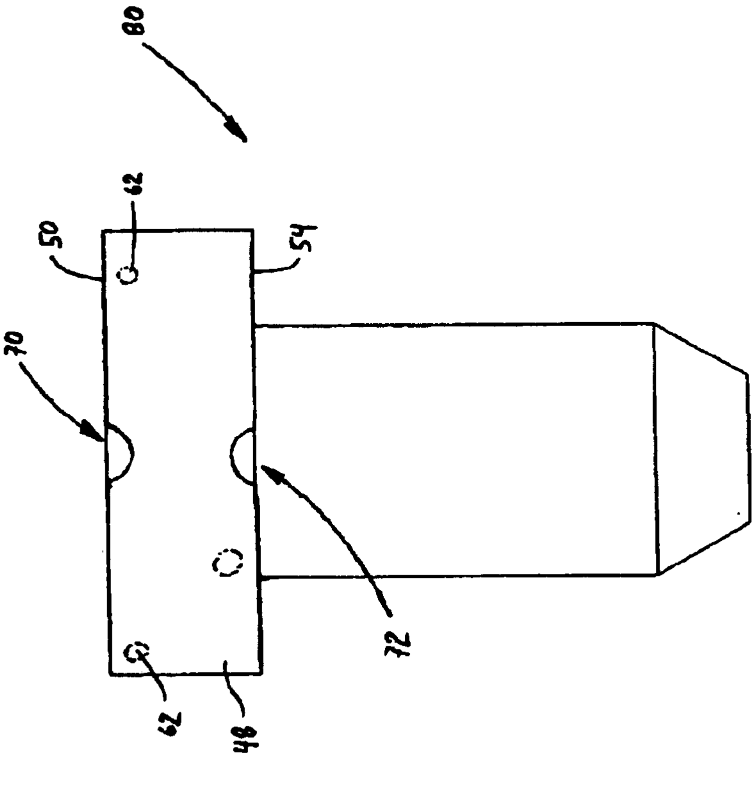
FIG. 10*b* is a side view of the third embodiment of the tip gas distributor in accordance with the principles of the present invention.

Referring now to FIGS. 10*a* and 10*b*, swirl passages 70 and secondary gas passages 72 are be formed between a tip gas distributor 80 and an adjacent component rather than exclusively through the tip gas distributor 20 as previously described. In one form as shown, the swirl passages 70 are formed between the tip gas distributor 80 and the tip seat 52 of the start cartridge 28, while the secondary gas passages 72 are formed between the tip gas distributor 80 and the conductive insert 40 of the shield cup 30. As shown, the swirl passages 70 are preferably formed on the proximal face 50 of the tip gas distributor 80, while the secondary gas passages 72 are preferably formed on the distal face 54 of the tip gas distributor 80. Additionally, the tip gas distributor 80 may comprise at least one swirl passage 70 and/or at least one secondary gas passage 72, among the various forms of the present invention.

Alternately, the swirl holes 62 (shown in phantom) as previously described may be formed through the annular flange 48 of the tip gas distributor 80 while the secondary gas passages 72 are formed between the tip gas distributor 80 and an adjacent component such as the conductive insert 40. Conversely, the swirl passages 70 may be formed between the tip gas distributor 80 and an adjacent component, such as the tip seat 52, while the secondary gas holes 64 (shown in phantom) as previously described are formed through the annular flange 48 of the tip gas distributor 80. Accordingly, a combination of holes and passages may be employed in the tip gas distributor 80 in accordance with the teachings of the present invention.

Figure 11:
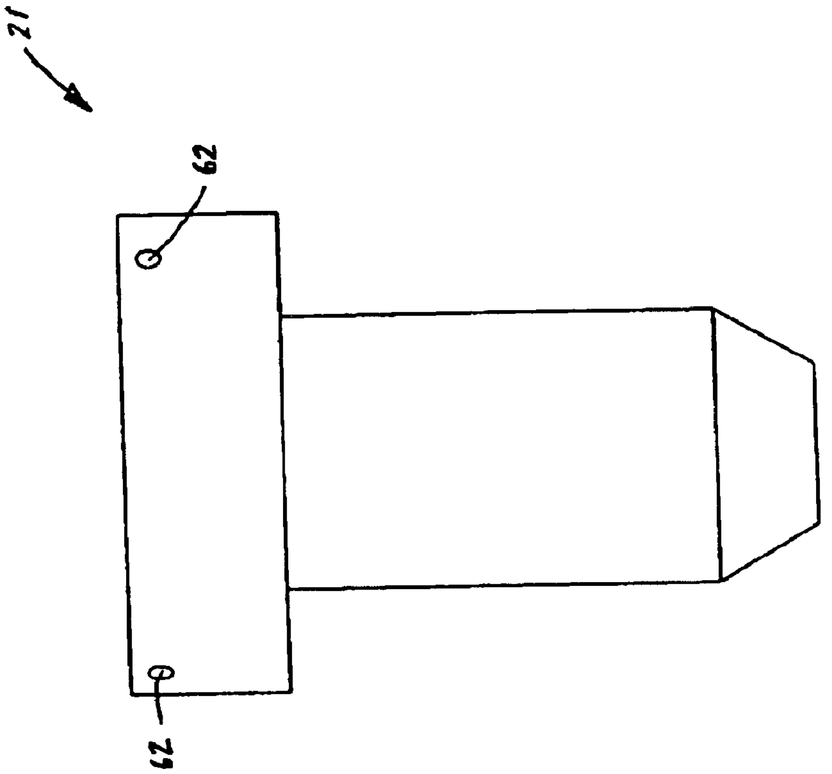
FIG. 11 is a side view of a fourth embodiment of a tip gas distributor illustrating swirl holes and constructed in accordance with the principles of the present invention.
Figure 12:
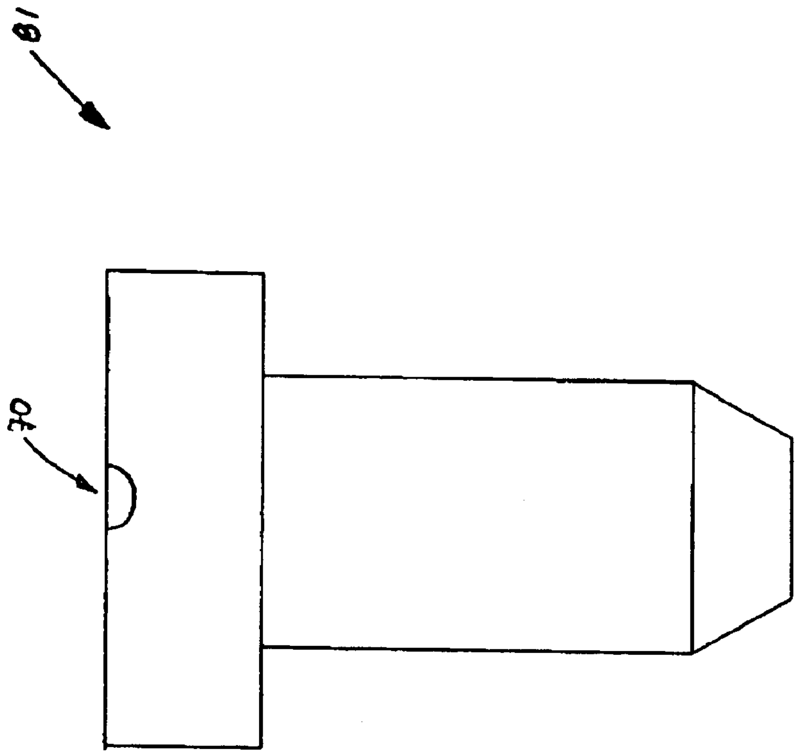
FIG. 12 is a side view of a fifth embodiment of a tip gas distributor illustrating a swirl passage and constructed in accordance with the principles of the present invention.
Figure 13:
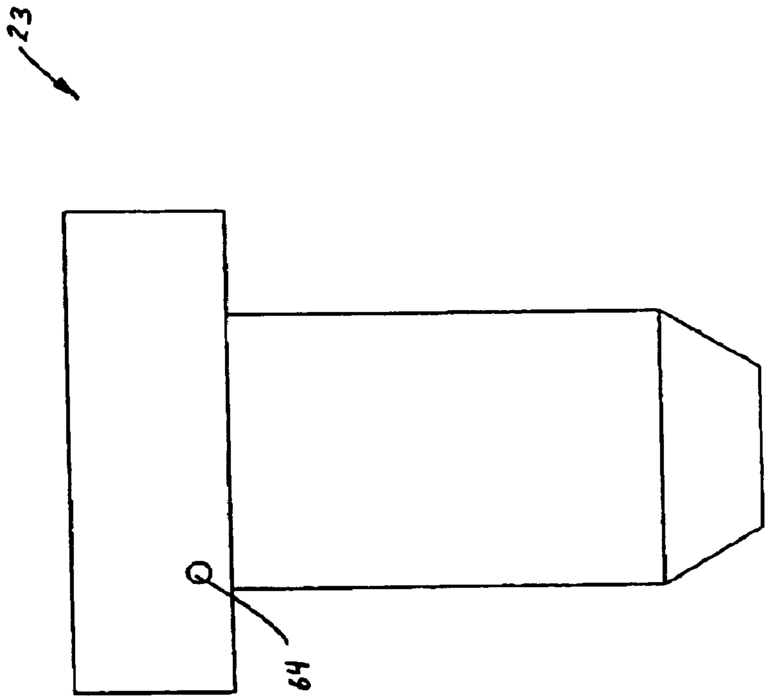
FIG. 13 is a side view of a sixth embodiment of a tip gas distributor illustrating a secondary gas hole and constructed in accordance with the principles of the present invention.
Figure 14:
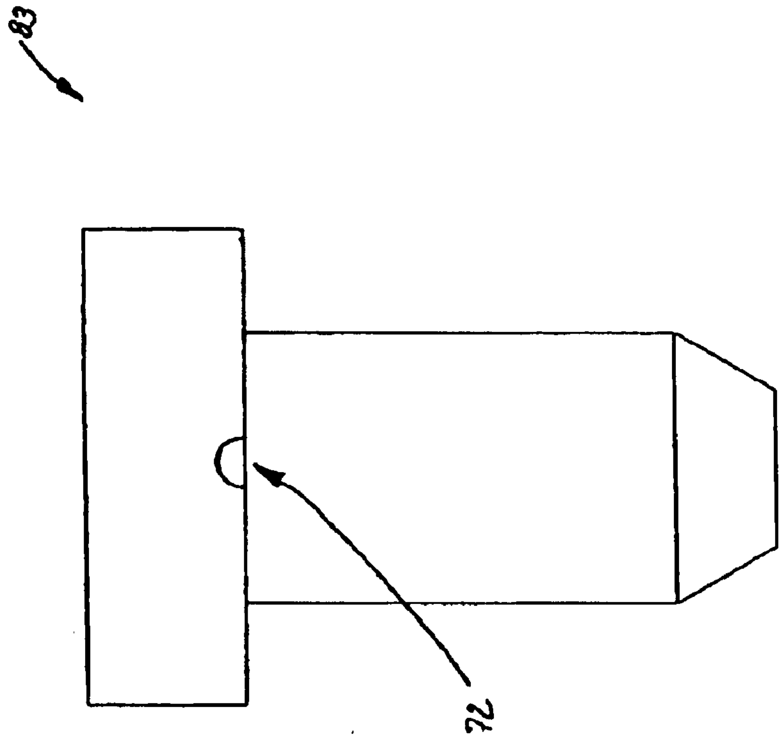
FIG. 14 is a side view of a seventh embodiment of a tip gas distributor illustrating a secondary gas passage and constructed in accordance with the principles of the present invention.
Figure 16:
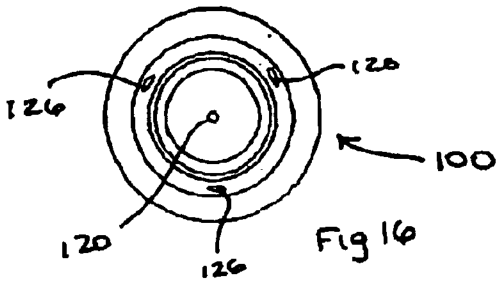
FIG. 16 is a proximal end plan view of the tip of the eighth embodiment.
Figure 15:
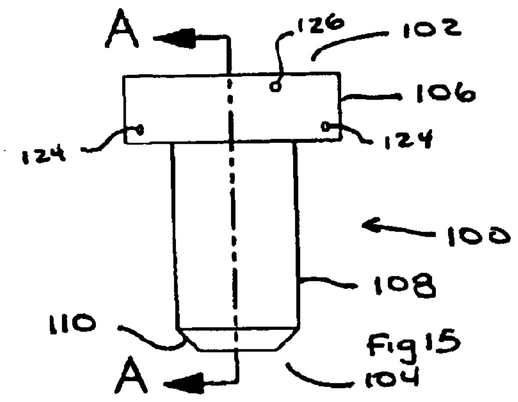
FIG. 15 is a side elevation view of an eight embodiment of a tip for a plasma arc torch constructed in accordance with the principles of this invention.

Referring now to FIGS. 11 and 12, additional embodiments of the present invention are illustrated, wherein tip gas distributors 21 and 81 comprise swirl holes 62 and swirl passages 70, respectively, without the secondary gas holes 64 or secondary gas passages 72 as previously described. Accordingly, the tip gas distributors 21 and 81 regulate the flow of plasma gas for generation of a plasma stream as previously described. Alternately, as shown in FIGS. 13 and 14, tip gas distributors 23 and 83 comprise secondary gas holes 64 and secondary gas passages 72, respectively, without the swirl holes 62 or swirl passages 70 as previously described. Similarly, the tip gas distributors 23 and 83 regulate the flow of secondary gas to stabilize the plasma stream. Accordingly, the tip gas distributors 21, 23, 81, and 83 serve additional functions beyond that of a conventional tip, (e.g., regulating the plasma stream exiting the tip and maintaining the positive, or anode, side of the power supply), by providing gas distribution functions not heretofore observed in plasma arc torches of the art.

In yet other forms of the present invention, methods of directing a plasma gas to generate a plasma stream and directing a secondary gas to stabilize the plasma stream are provided, which generally comprise the steps of providing a source of gas, distributing the gas through a plasma arc apparatus to generate the plasma gas and the secondary gas, directing the plasma gas through at least one, and preferably a plurality of, swirl hole(s) formed in a tip gas distributor of the plasma arc apparatus, and directing the secondary gas through at least one, and preferably a plurality of, secondary gas hole(s) formed in the tip gas distributor. Additional methods of generating a plasma stream and directing a secondary gas to stabilize the plasma stream are provided that direct the plasma gas through at least one, and preferably a plurality of, swirl passage(s) and further direct the secondary gas through at least one, and preferably a plurality of, secondary gas passage(s). Accordingly, the swirl holes or passages regulate the plasma gas to generate the plasma stream, while the secondary gas holes or passages regulate the secondary gas to stabilize the plasma stream exiting the tip gas distributor.

In summary, the tip gas distributors as described herein regulate either or both a plasma gas that is used to generate a plasma stream and a secondary gas that is used to stabilize the plasma stream. Accordingly, a single component serves multiple functions as opposed to numerous torch components that perform the same functions (i.e., generating a plasma stream, stabilizing the plasma stream, and tip functions) as required in plasma arc torches in the art. As a result, operation of the plasma arc torch is simplified and the number of consumable parts required to operate at different current levels is significantly reduced, along with a significant reduction in the amount of inventory required to support operation of a single plasma arc torch at different current levels.

An eighth embodiment of a plasma arc torch tip constructed according to the principles of this invention is indicated generally as 100 in FIGS. 15–18. The tip 100, like tip 20 described above, is adapted to fit within, and operate as one of the consumable parts of, a plasma arc apparatus. Like tip gas distributor 20, the tip 100 is a conductive member and is preferably formed of a copper or copper alloy material.

Figure 17:
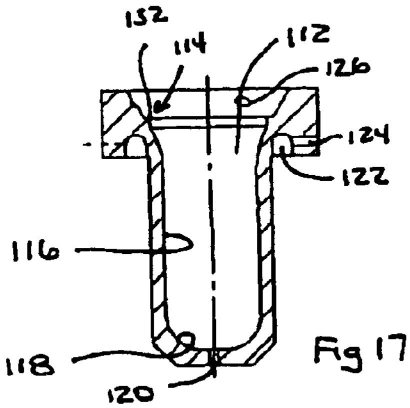
FIG. 17 is a longitudinal cross sectional view taken the plane of line 17—17 in FIG. 15.
Figure 18:
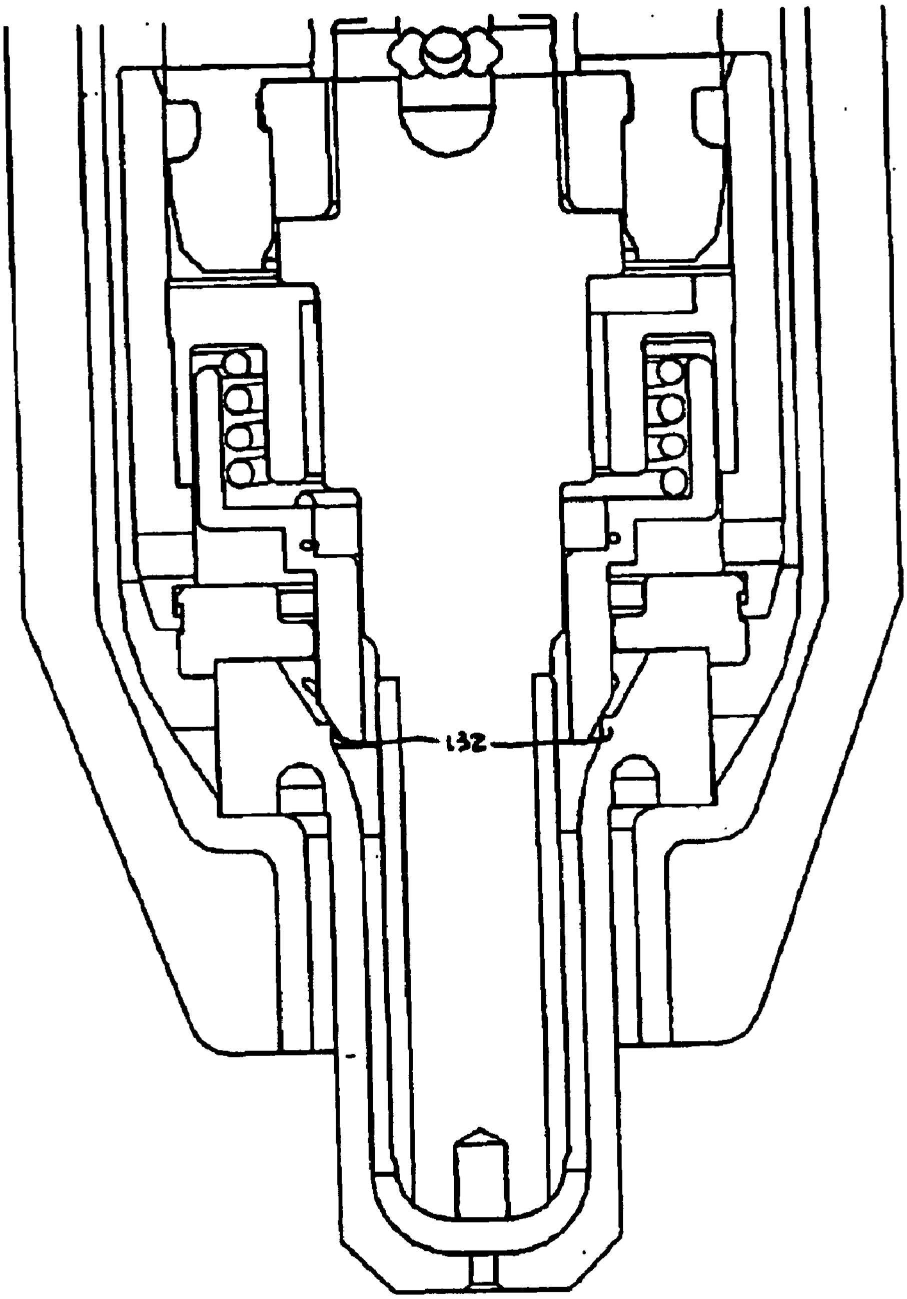
FIG. 18 is a transverse cross-sectional view of a plasma arc torch incorporating the tip of the eighth embodiment and a start cartridge with a contact member.

The tip 100 has a proximal end 102 and a distal end 104. The tip comprises a generally cylindrical flange 106 and a generally cylindrical distal section 108, having a chamfered end 110. As best shown in FIG. 17, tip 100 is hollow with a space 112 having a proximal portion 114 with tapering configuration adjacent the proximal end of the tip, a central portion 116 of generally constant cross section, and a distal rounded end 118 adjacent the distal end 104 of the tip. There is a central exit orifice 120 in the distal end of the of the tip 100, communicating with the space 112.

There is an annular recess 122 in the distal face of the base flange 106. A plurality of secondary gas holes 124 extend from the exterior surface of the base flange 106 to the annular recess 122. A plurality of swirl holes 126 extend from the exterior surface of the base 106 to the proximal portion 114 of the space 112. The passages 126 are oriented at an angle with respect to the radial direction.

The tip 100 is mounted over a distal portion of an electrode and is in a radially and longitudinally spaced relationship with the electrode to form a primary gas passage, which is also referred to as an arc chamber or plasma chamber. A central exit orifice 120 of the tip 100 communicates with the primary gas passage for exhausting ionized gas in the form of a plasma stream from tip gas distributor and directing the plasma stream down against a workpiece. The annular flange 106 defines a generally flat, proximal face 128 that seats against and seals with a tip seat of the start cartridge, and a distal face 130 adapted to seat within and make electrical contact with the conductive insert disposed within the shield cup. The conductive insert is further adapted for connection with the anode, such as through a threaded connection, such that electrical continuity between the positive side of the power supply is maintained.

Additionally, tapering proximal section 114 of the passage 112 the tip 100 defines a conical interior surface 130, which makes electrical contact with a portion of the start cartridge. In operation, a working gas is supplied to the tip 100 through a primary gas chamber 60 that extends distally from the torch head 22, wherein the working gas is subsequently divided into a plasma gas to generate a plasma stream and a secondary gas to stabilize the plasma stream by the tip 100.

In operation, the working gas flows to the tip 100 and is split or divided into the plasma gas and the secondary gas by the swirl holes 126 and the secondary gas holes 124, respectively. The plasma gas flows through the swirl holes 126 and is swirled proximate the conical interior surface 130 to generate the plasma stream. The secondary gas flows through the secondary gas holes 124, into the annular recess 122, and along the cylindrical distal portion 108 to stabilize the plasma stream as the stream exits the central exit orifice 114. Accordingly, the tip 100 regulates the plasma gas and the secondary gas, while metering the plasma stream and maintaining the positive, or anode, side of the power supply. As illustrated, the tip 100 in one form comprises three (3) swirl holes 126 and three (3) secondary gas holes 124 spaced evenly around the annular flange 106, although some other configuration could be used as describe above, depending upon the operating conditions.

In accordance with the principles of the present invention, the tip 100 further comprises an annular ridge 132 formed in the conical surface 130 of the proximal portion 114 of the passage. The ridge 132 is formed by a 90 degree corner of triangular projection. The ridge 132 provides a small area of electrical contact between the tip and the contact member of the start cartridge. This electrical contact is important during initiation of the plasma arc. However the reduction of the surface area of contact, increases the force per unit area of the contact between the tip and the start cartridge for a given spring size, which helps prevent coatings from oxides and combustion products from interfering with electrical contact between the tip and the start cartridge. At the potentials involved in plasma arc initiation, these coatings typically do not significantly affect performance. However at lower potentials, such as might be used to test whether the components are present and properly installed, these coatings might impede conductance, causing control circuitry to falsely determine that parts of the system are missing or improperly installed. The ridge 132 helps to prevent these false indications, which could trigger false alarms or even cause the system to prevent the plasma torch from operating.

Figure 19:
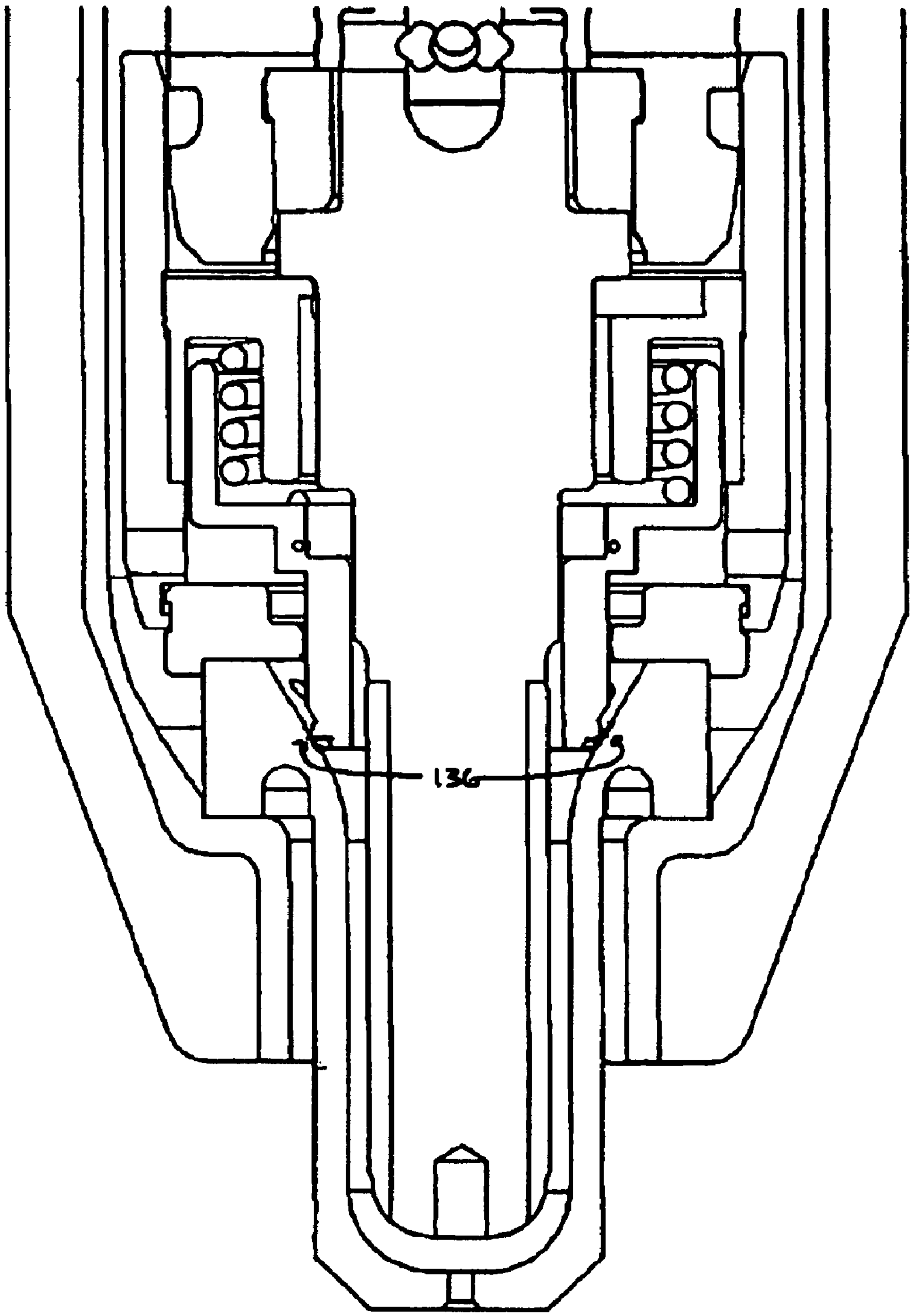
FIG. 19 is an alternate construction of the plasma arc torch in FIG. 18.
Figure 21:
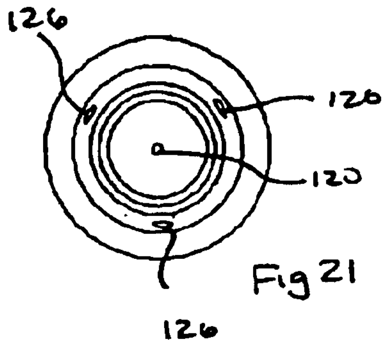
FIG. 21 is a proximal end plan view of the tip of the ninth embodiment.
Figure 20:
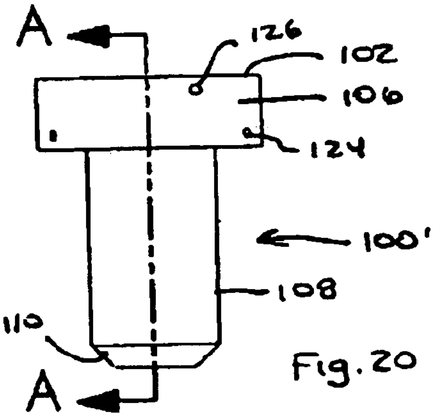
FIG. 20 is a side elevation view of a ninth embodiment of a tip for a plasma arc torch constructed in accordance with the principles of this invention.
Figure 22:
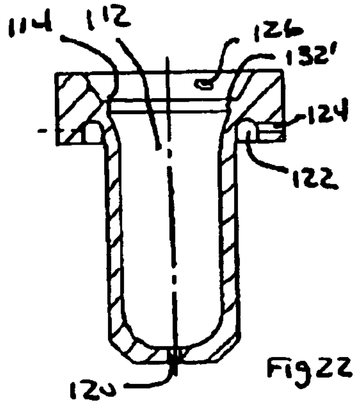
FIG. 22 is a longitudinal cross sectional view taken the plane of line 22—22 in FIG. 20.
Figure 23:
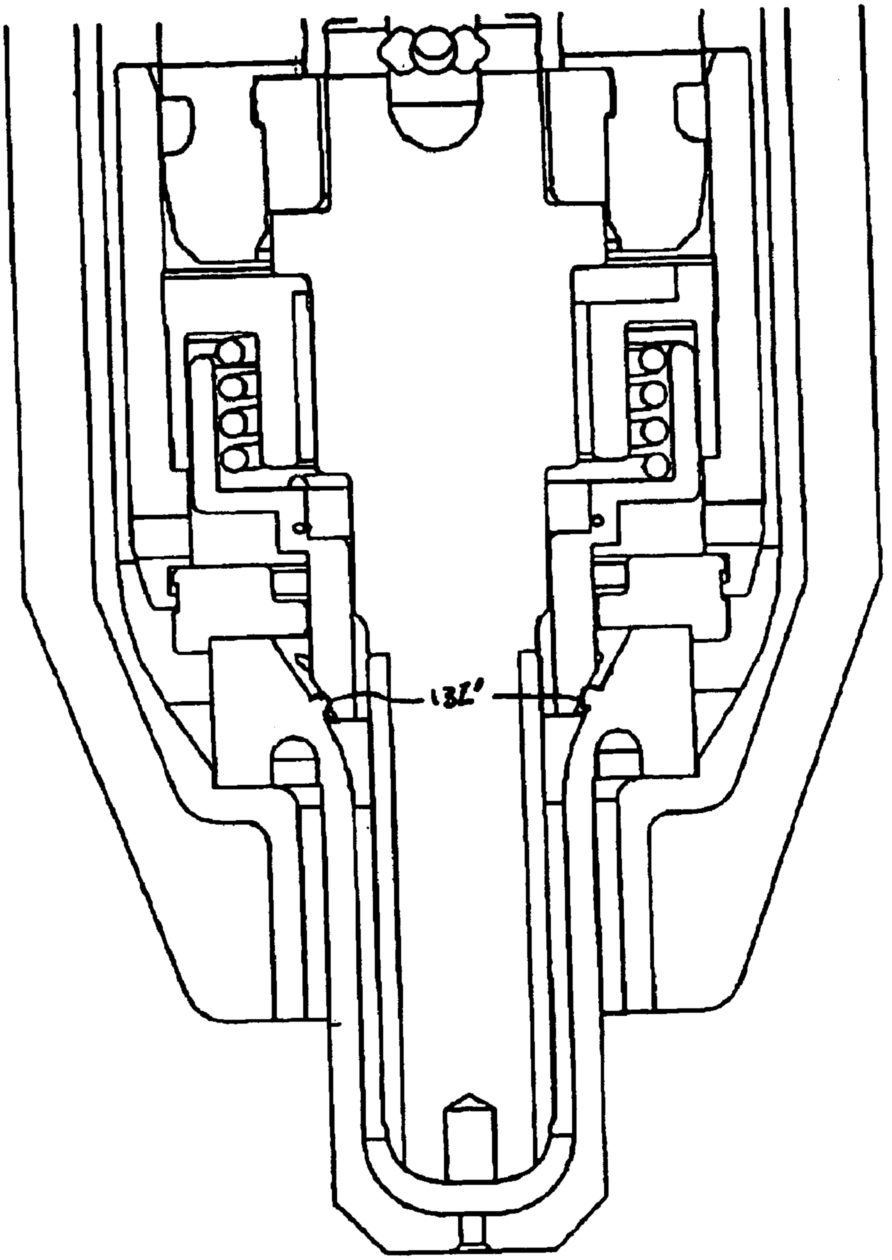
FIG. 23 is a transverse cross-sectional view of a plasma arc torch incorporating the tip of the ninth embodiment and a start cartridge with a contact member.

Instead of ridge 132 on the tip 100, as shown in FIG. 19 a ridge 134 could be formed on the contact member of the start cartridge that engages the surface of the proximal section 114 of the space 112 of the tip 100.

A ninth embodiment of a tip for a plasma arc torch is indicated generally as 100' in FIGS. 20–24. Tip 100' is similar to tip 100, and corresponding parts are identified with corresponding reference numerals. However, instead of ridge 132, the tip 100' has a ridge 132' with a generally semi-circular cross-section of relatively small radius. The ridge 132', like ridge 132, increases the contact pressure between the tip and the start cartridge.

Figure 24:
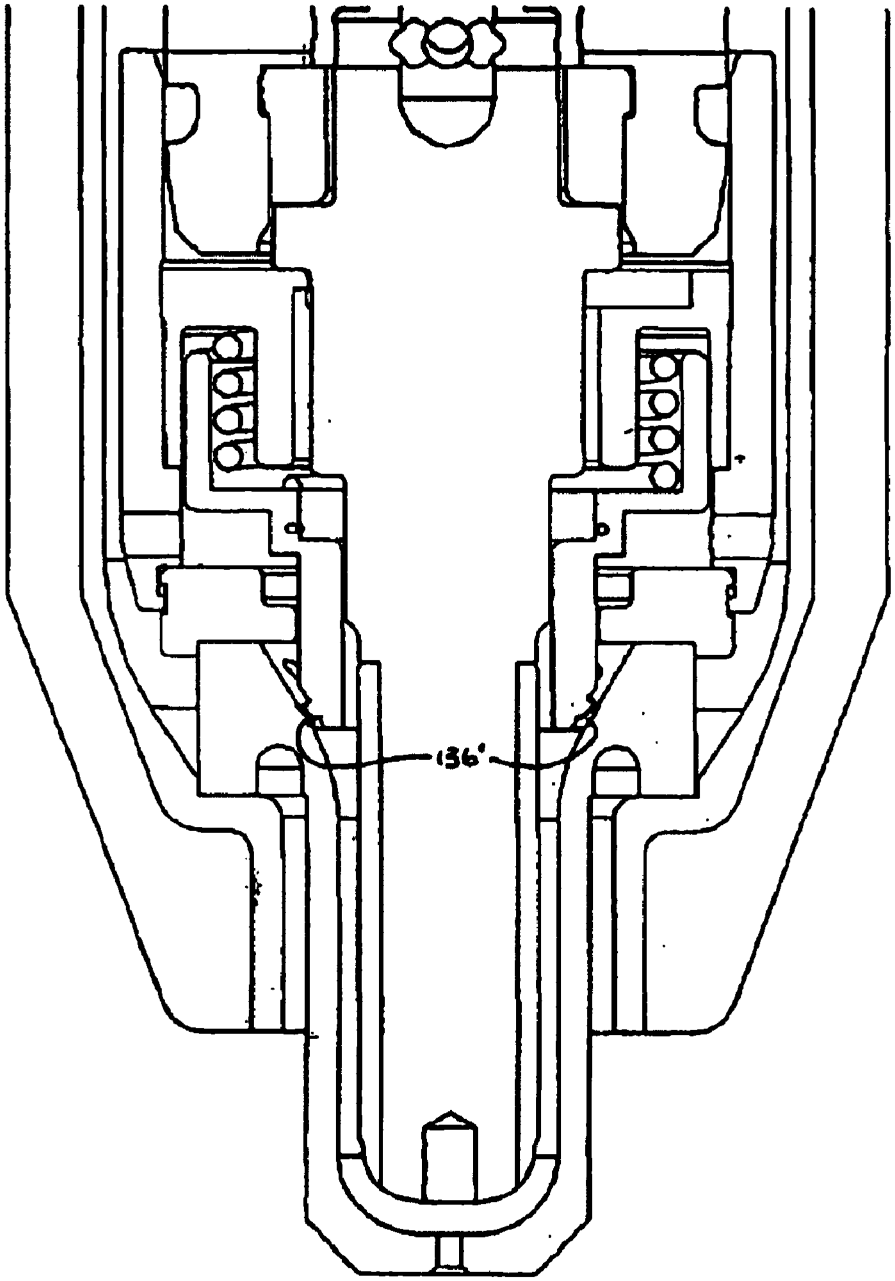
FIG. 24 is an alternate construction of the plasma arc torch in FIG. 23.
Figure 26:
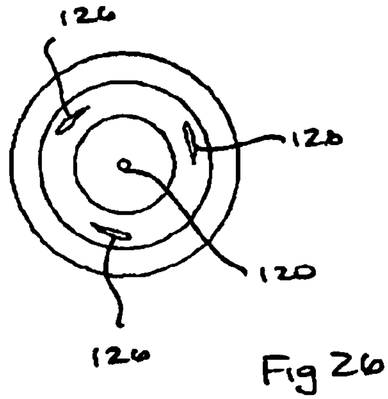
FIG. 26 is a proximal end elevation view of the tip of the tenth embodiment.
Figure 25:
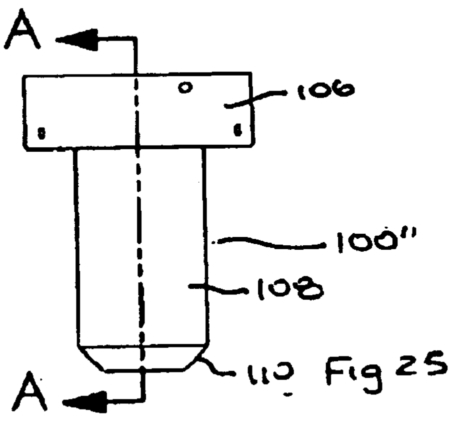
FIG. 25 is a side elevation view of a tenth embodiment of a tip for a plasma arc torch constructed in accordance with the principles of this invention.
Figure 27:
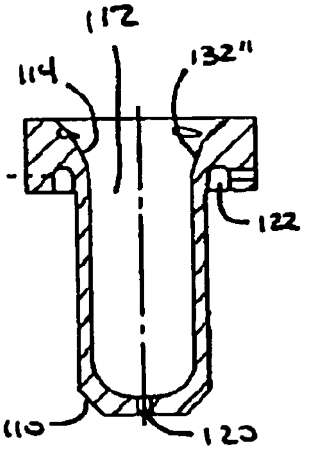
FIG. 27 is a longitudinal cross sectional view taken the plane of line 27—27 in FIG. 25.
Figure 28:
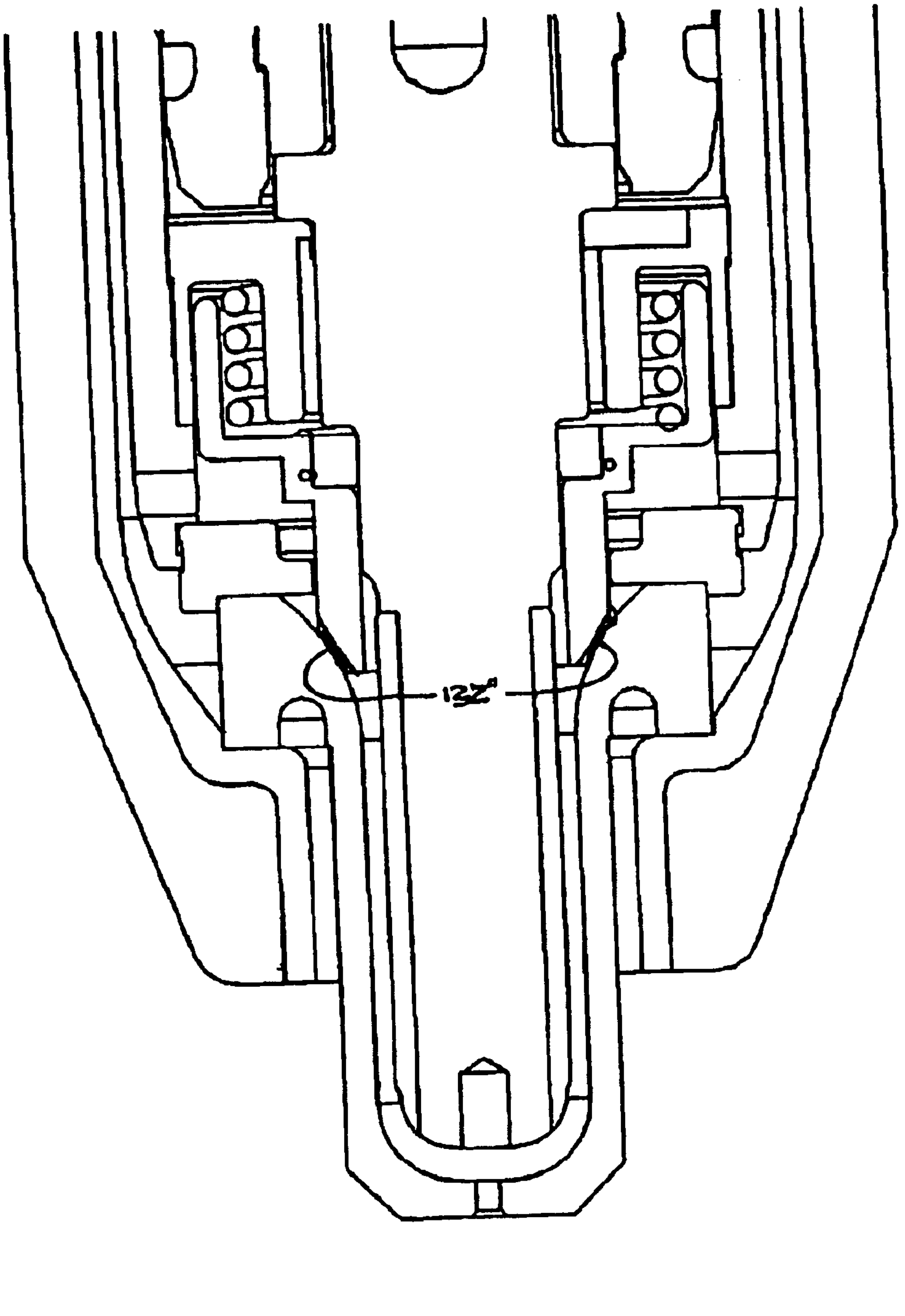
FIG. 28 is a transverse cross-sectional view of a plasma arc torch incorporating the tip of the tenth embodiment and a start cartridge with a contact member.
Figure 29:
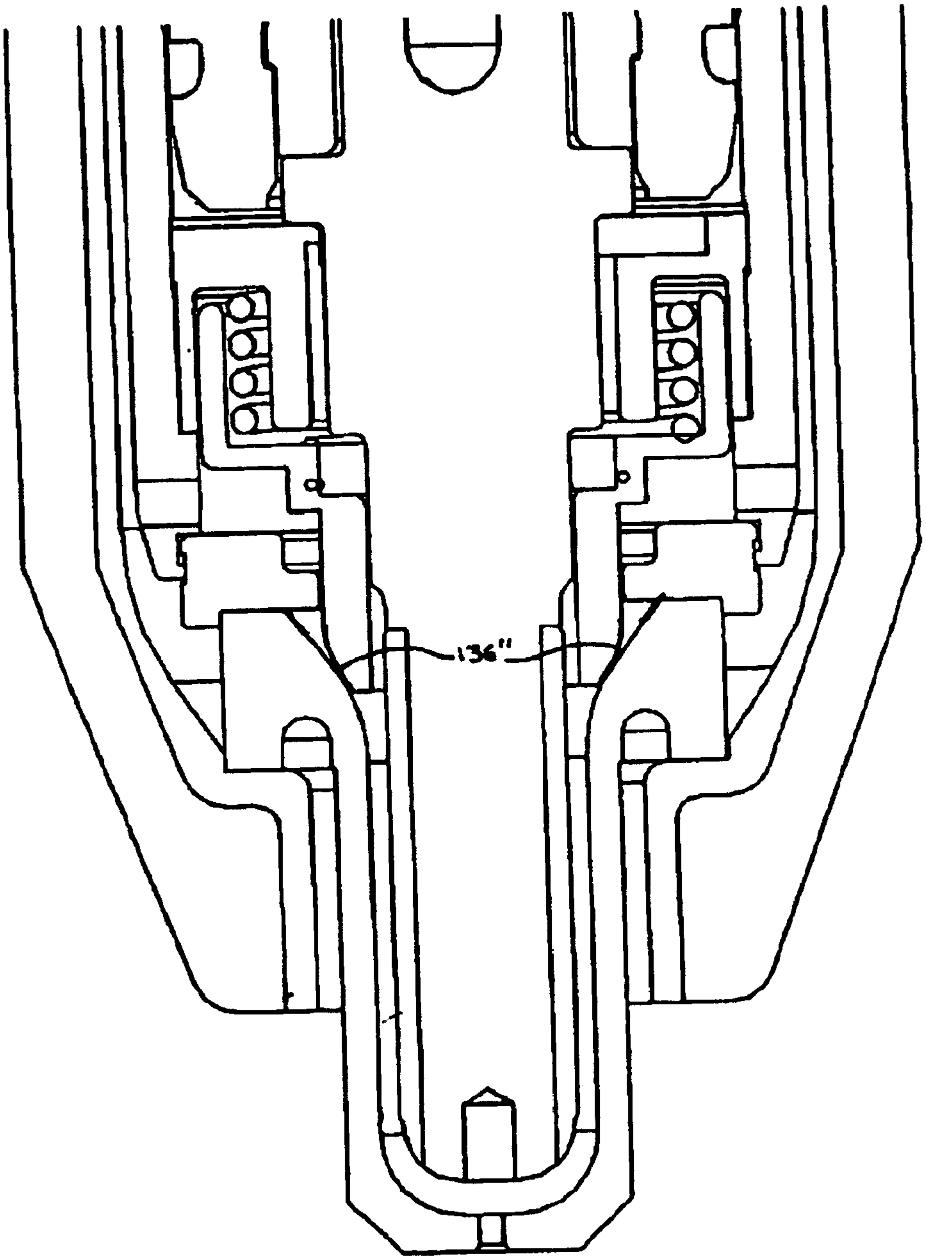
FIG. 29 is an alternate construction of the plasma arc torch in FIG. 28.
Figure 1:
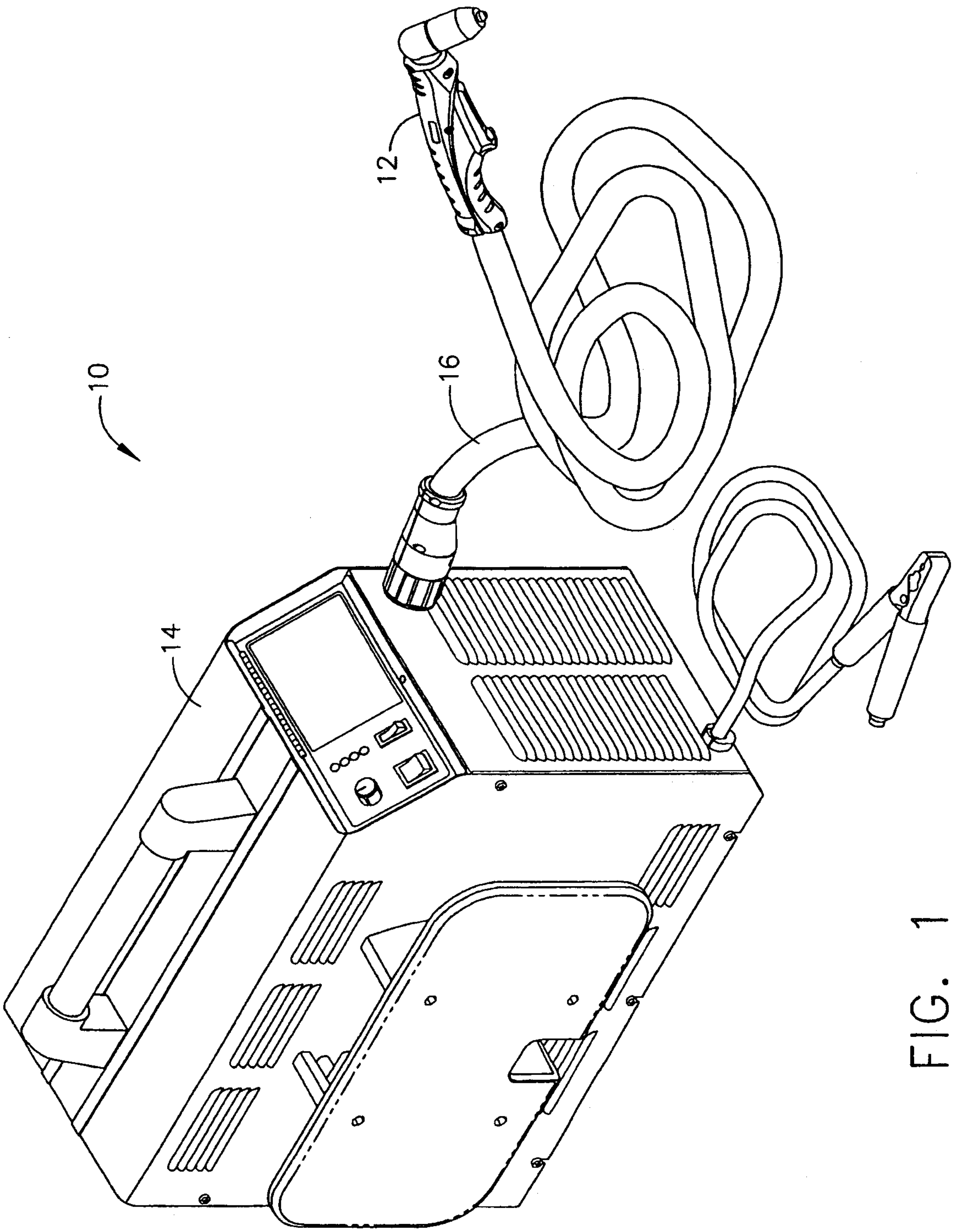
Figure 2:
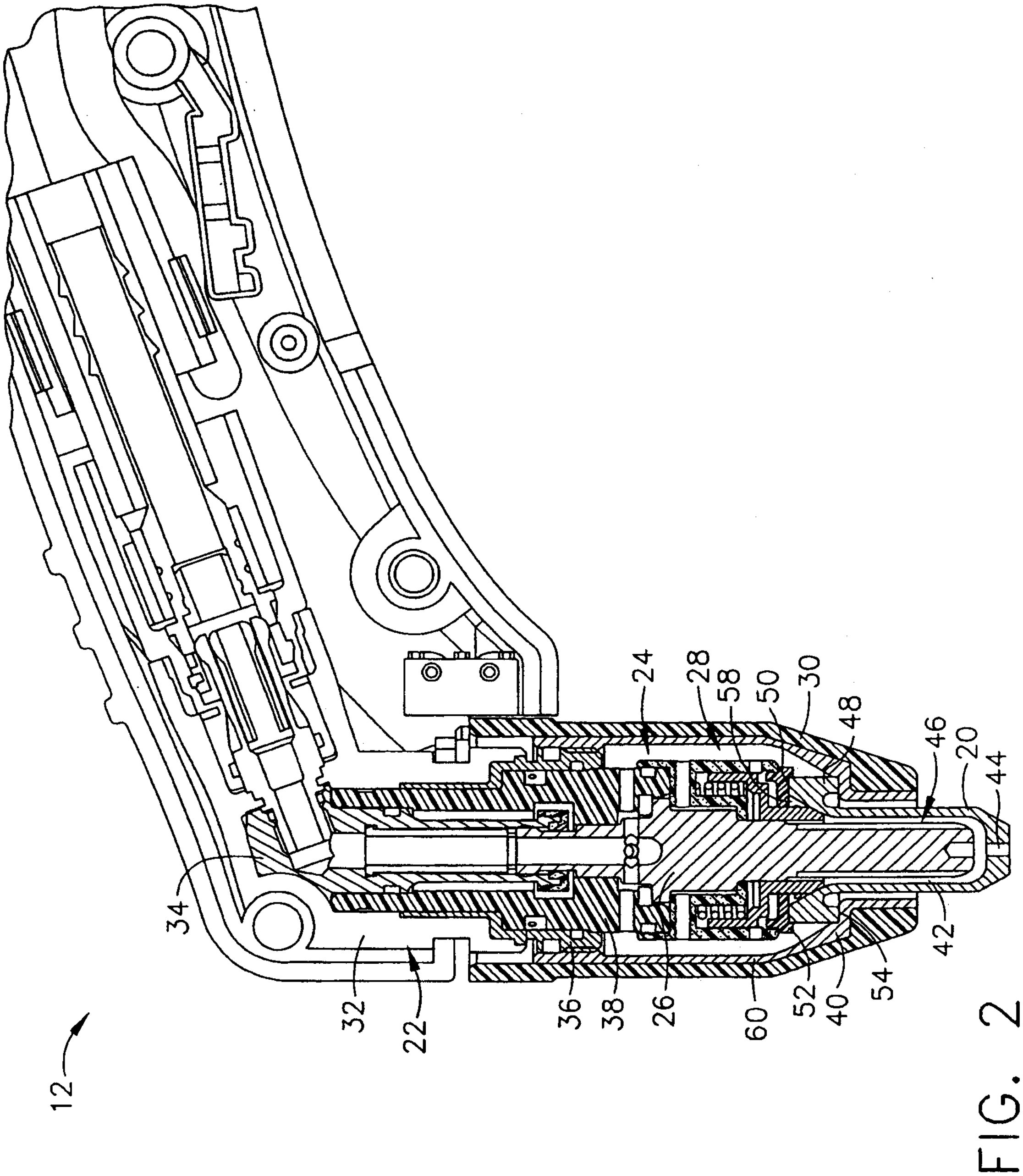
Figure 3:
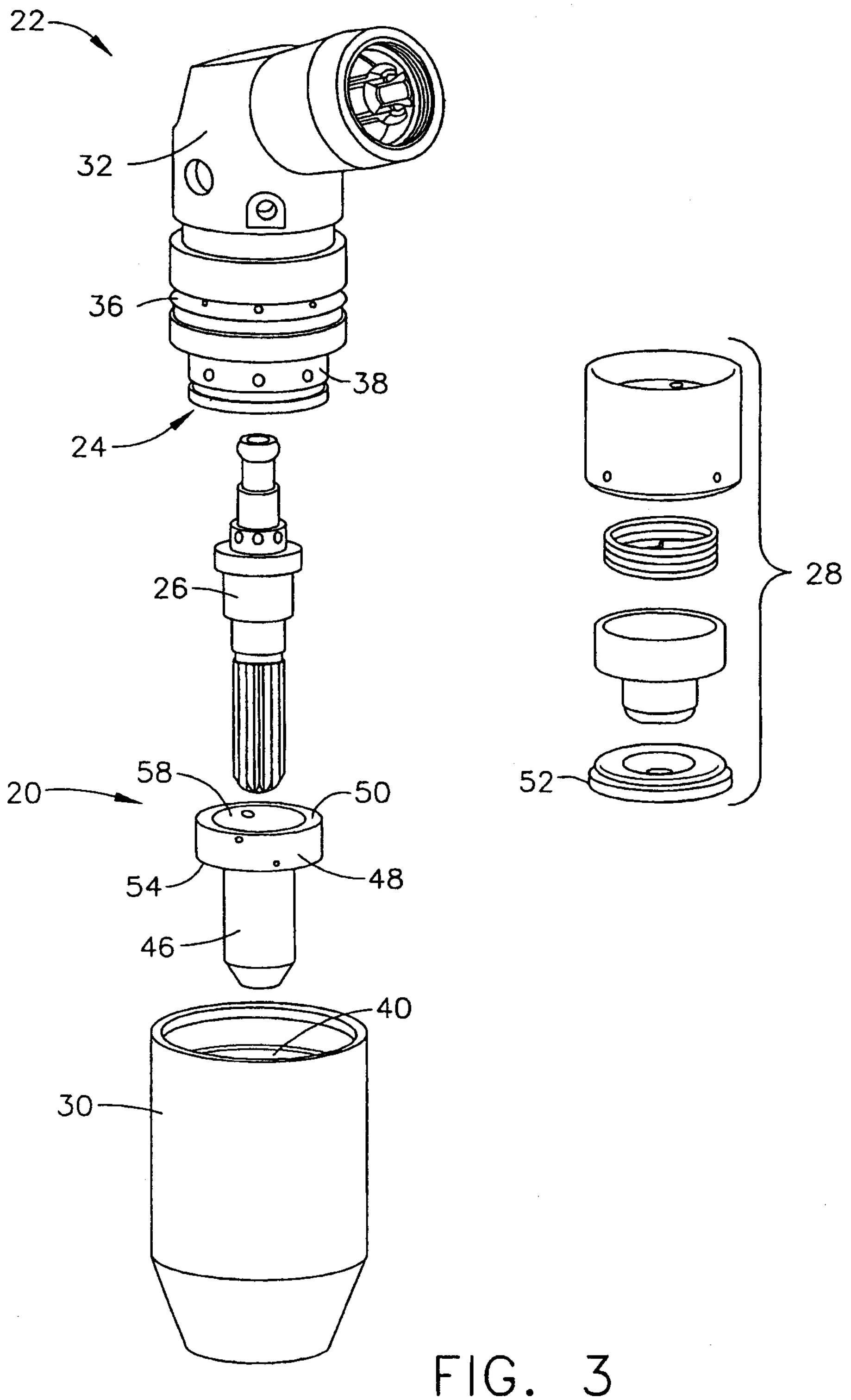
Figure 4A:
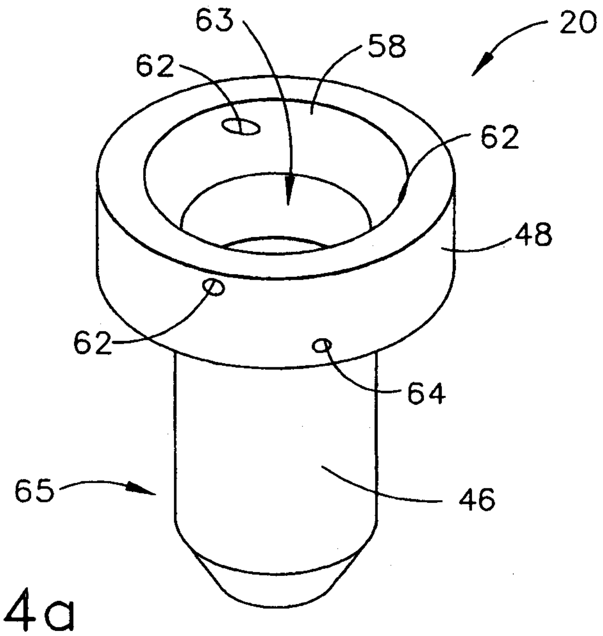
Figure 4B:
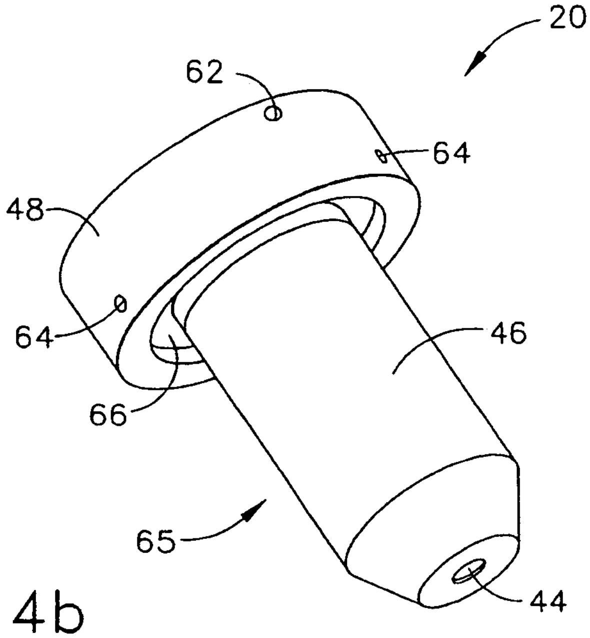
Figure 5:
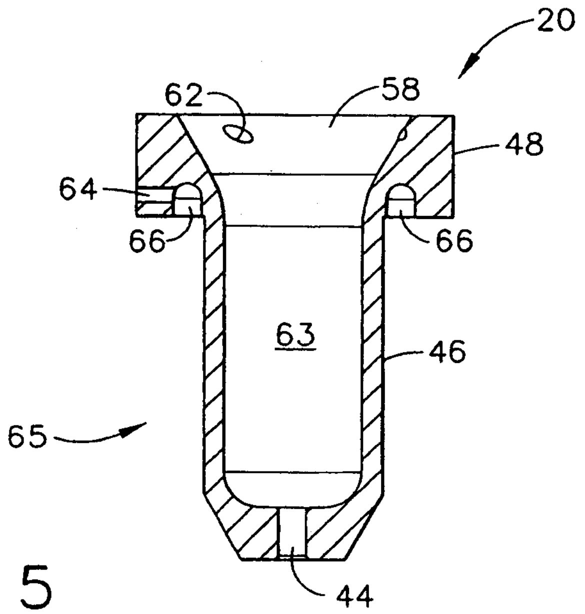
Figure 6:
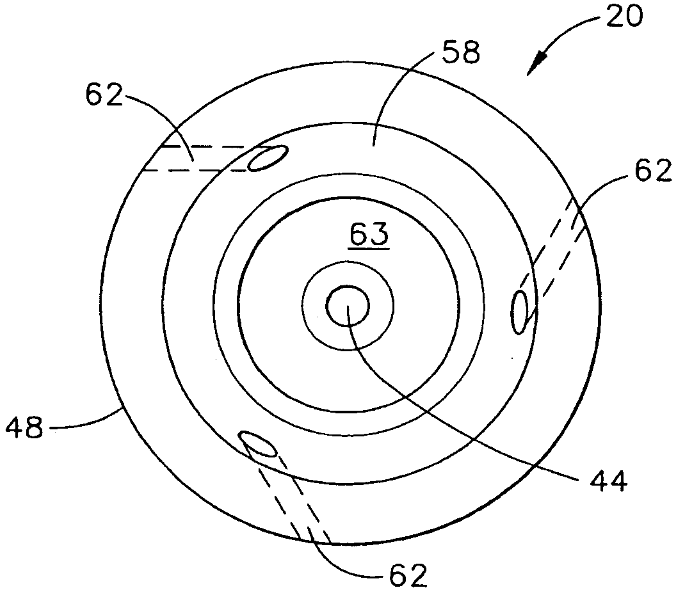
Figure 7:
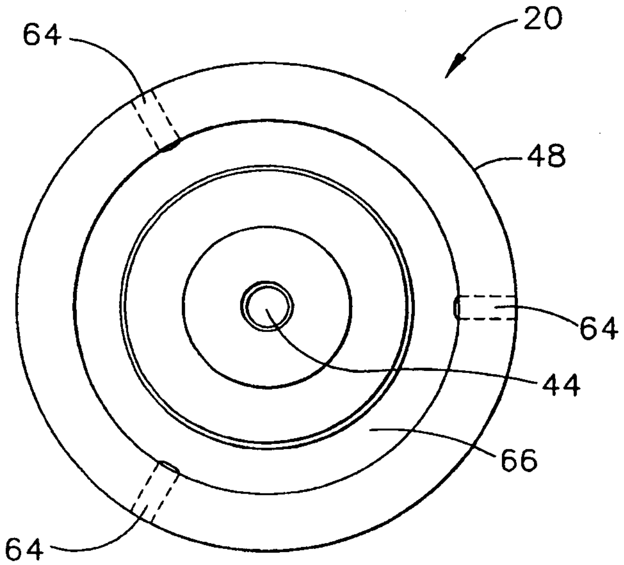
Figure 8:
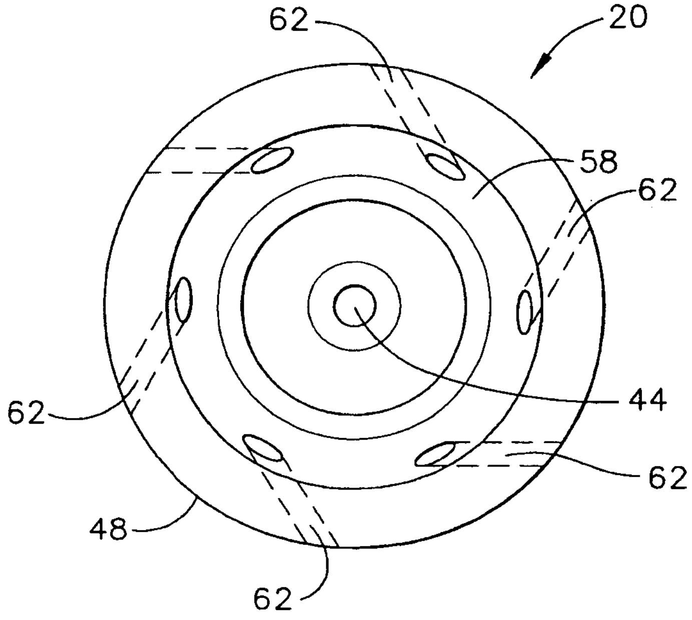
Figure 9:
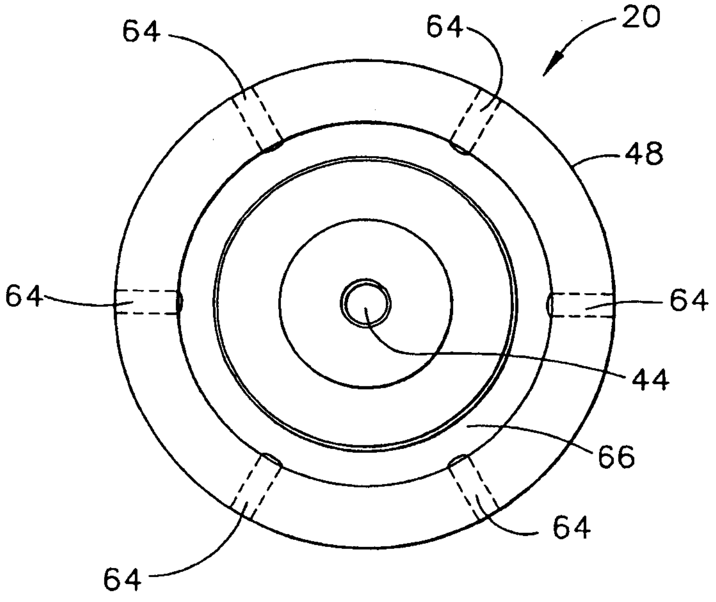
Figure 10A:
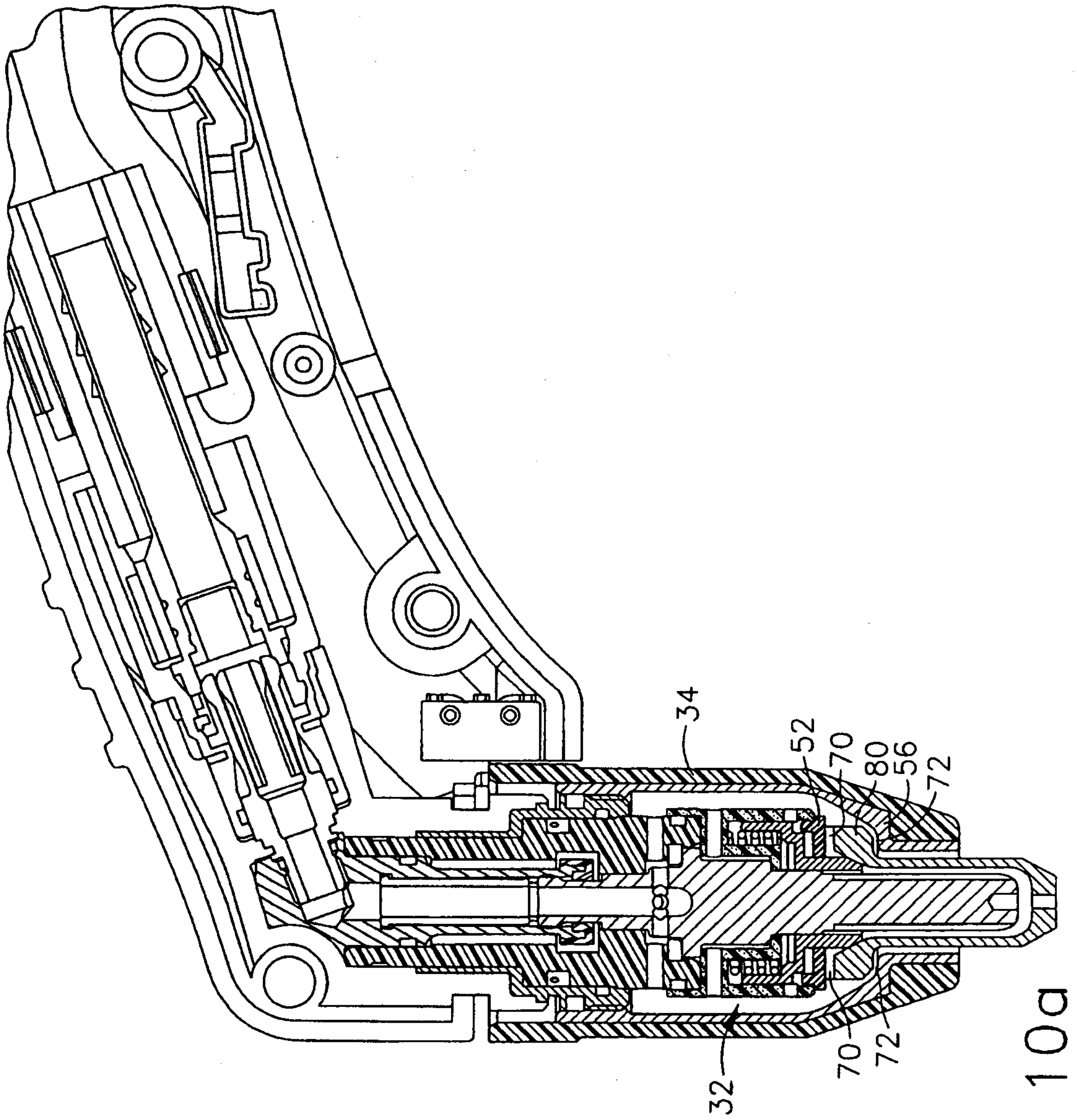
Figure 10B:
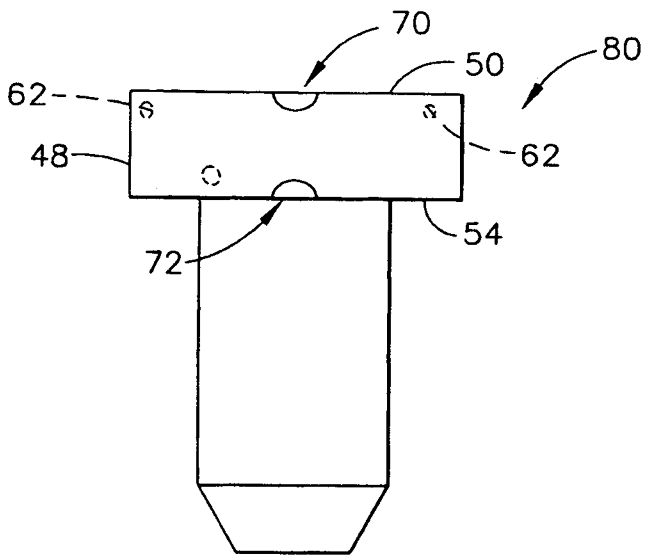
Figure 11:
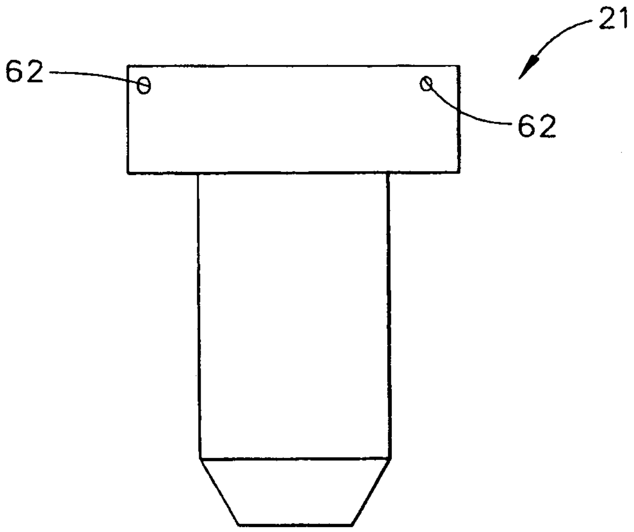
Figure 12:
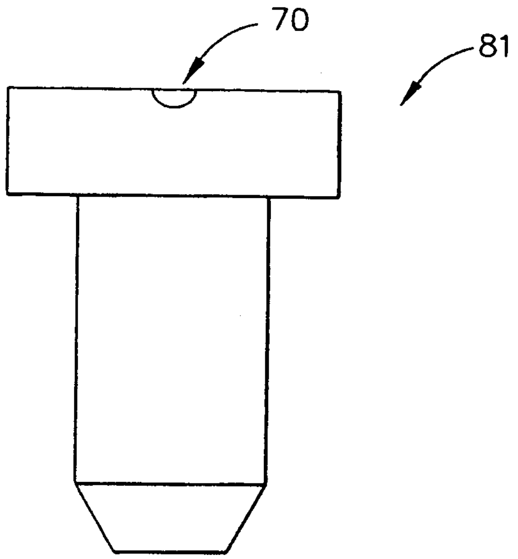
Figure 13:
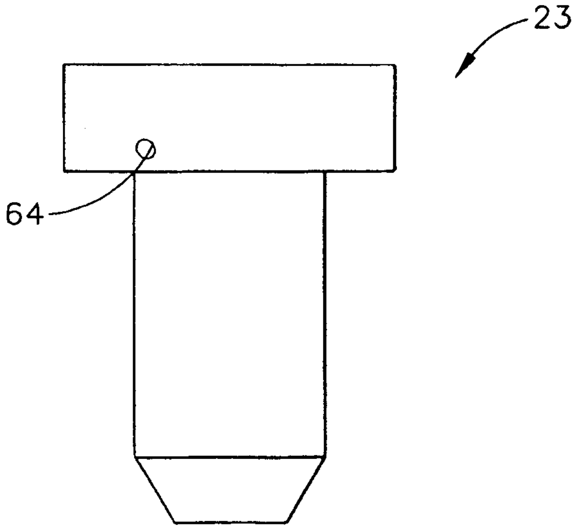
Figure 14:
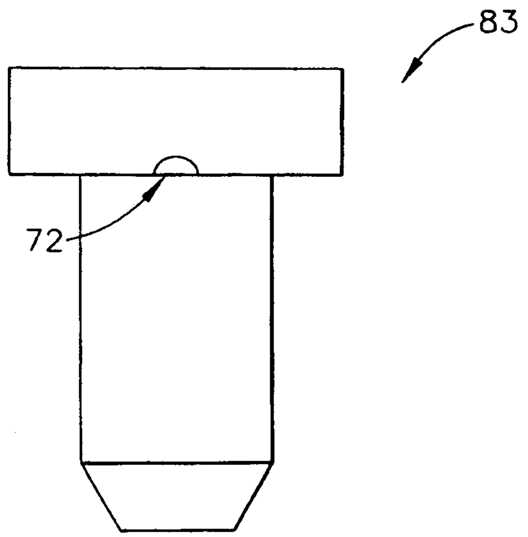
Figure 16:
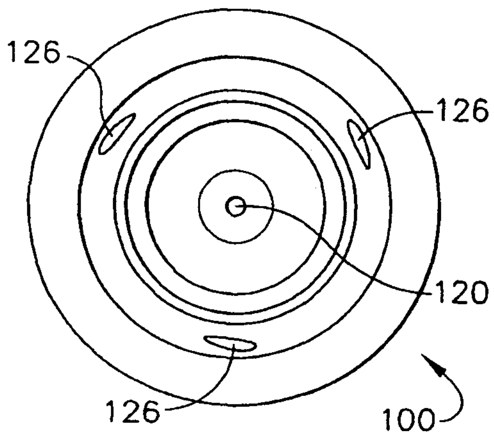
Figure 15:
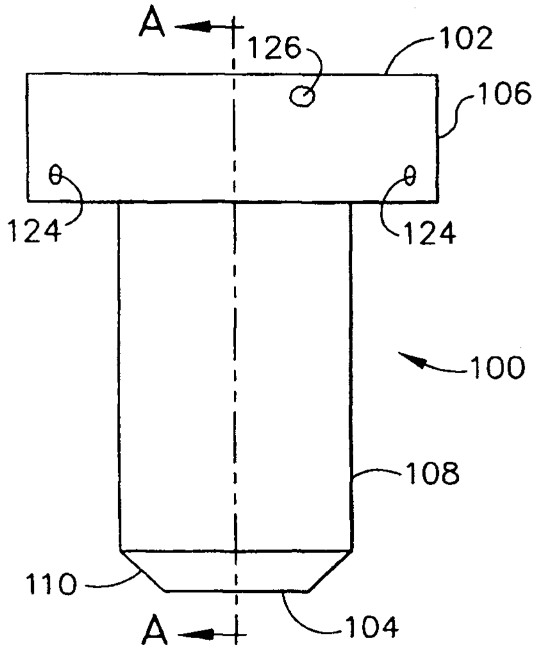
Figure 17:
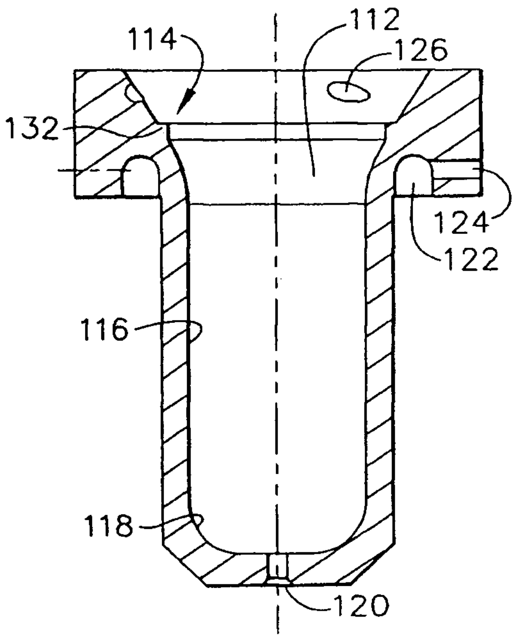
Figure 18:
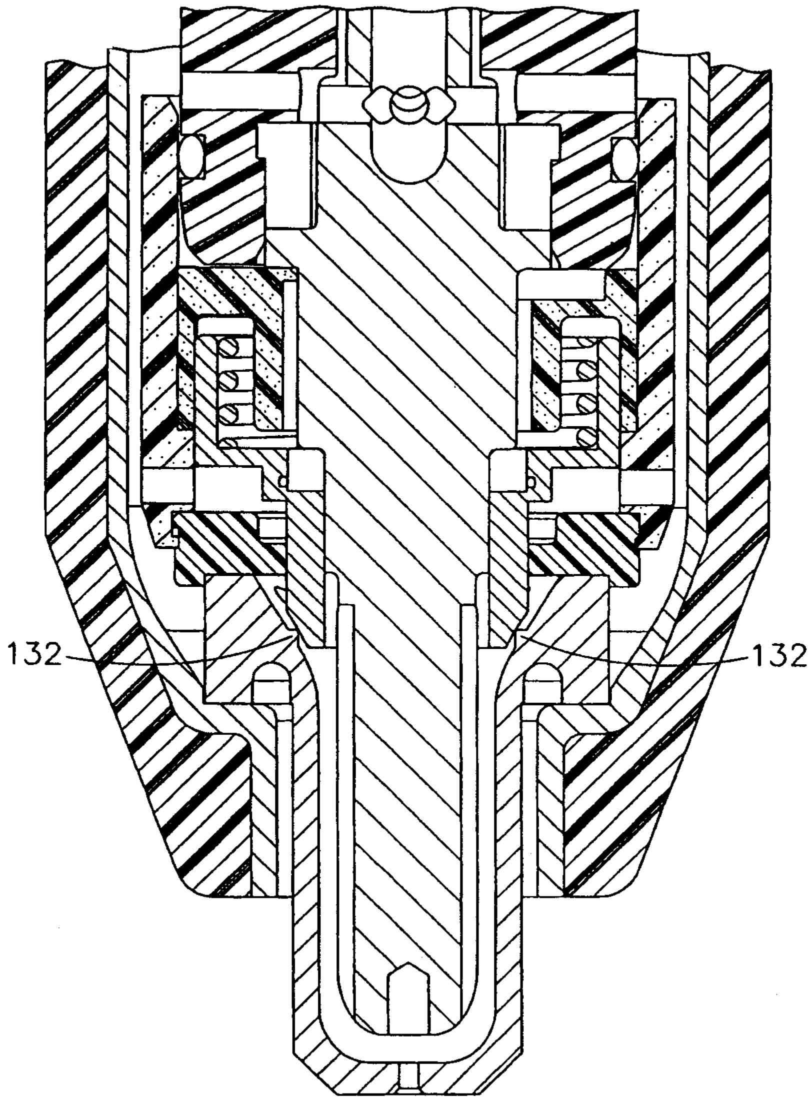
Figure 19:
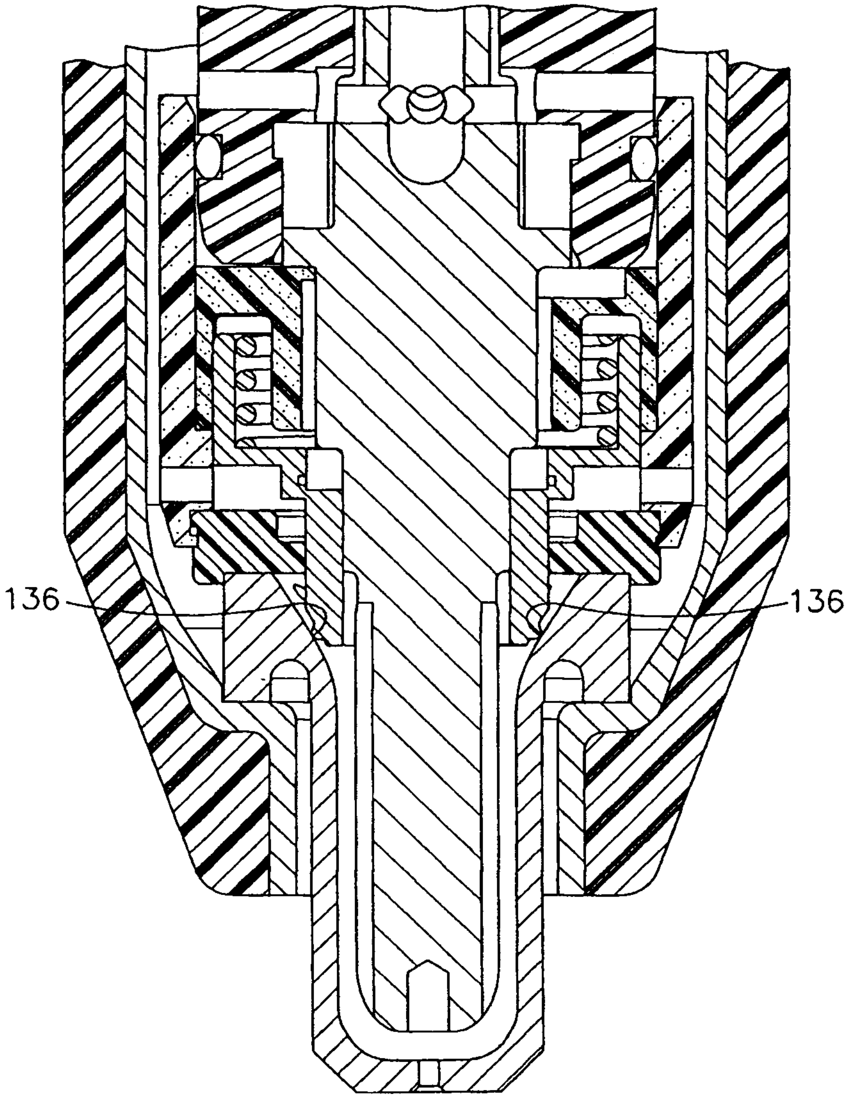
Figure 21:
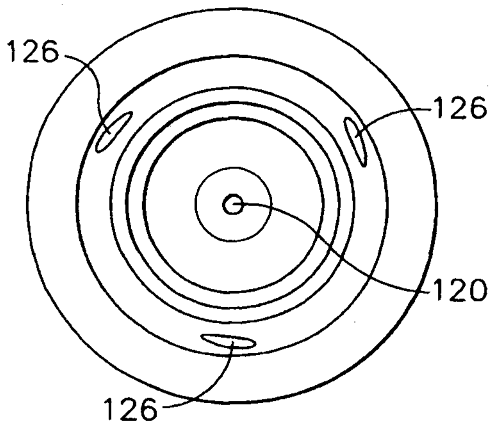
Figure 20:
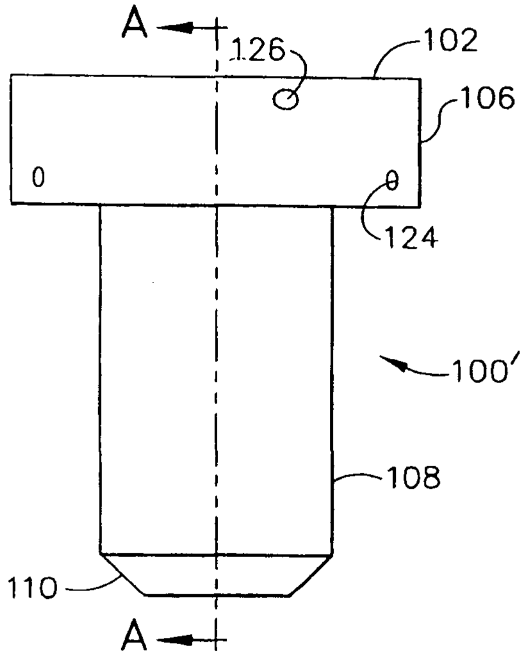
Figure 22:
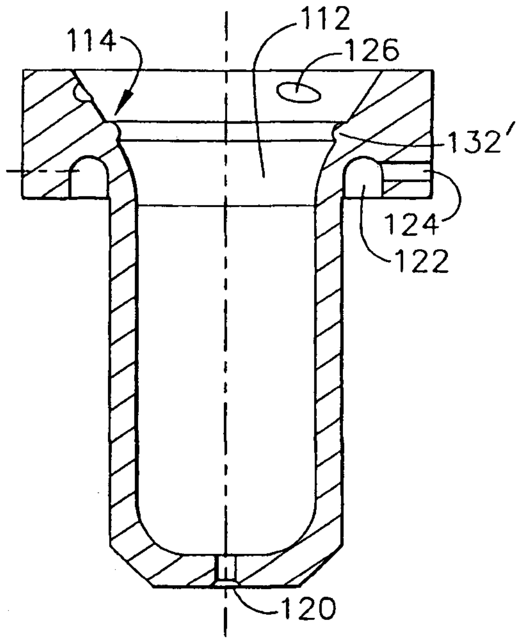
Figure 23:
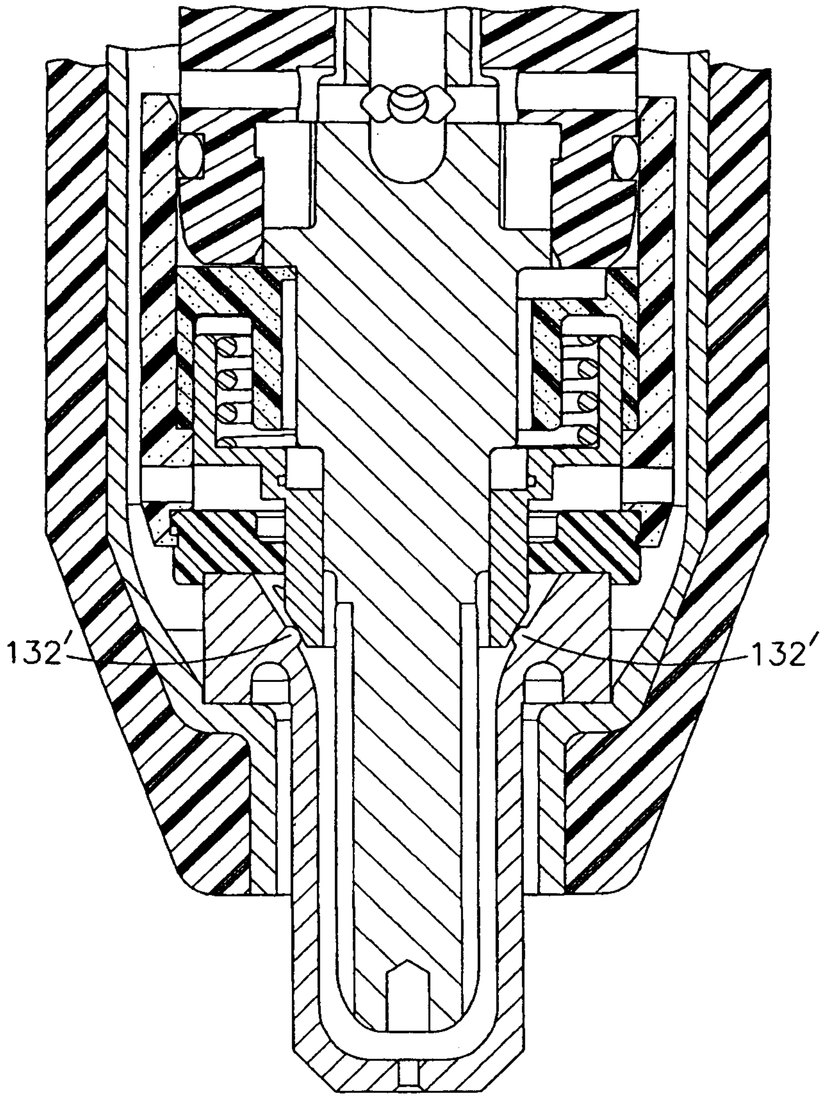
Figure 24:
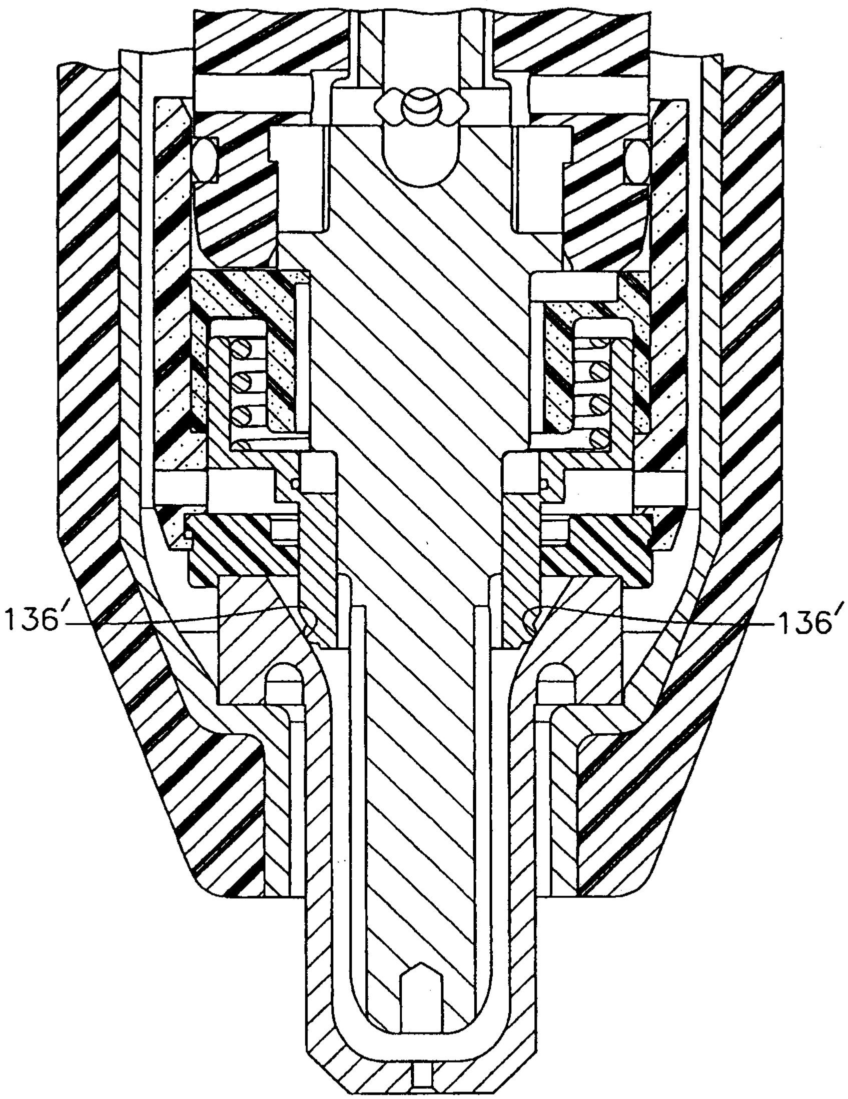
Figure 26:
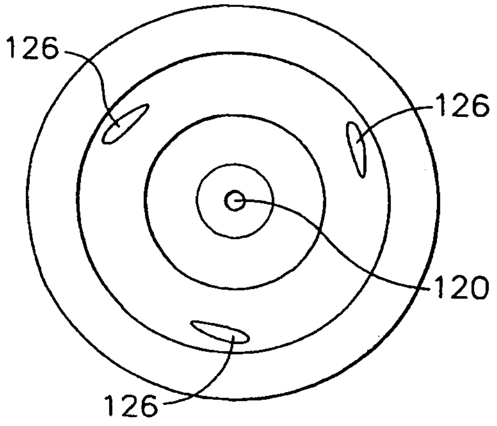
Figure 25:
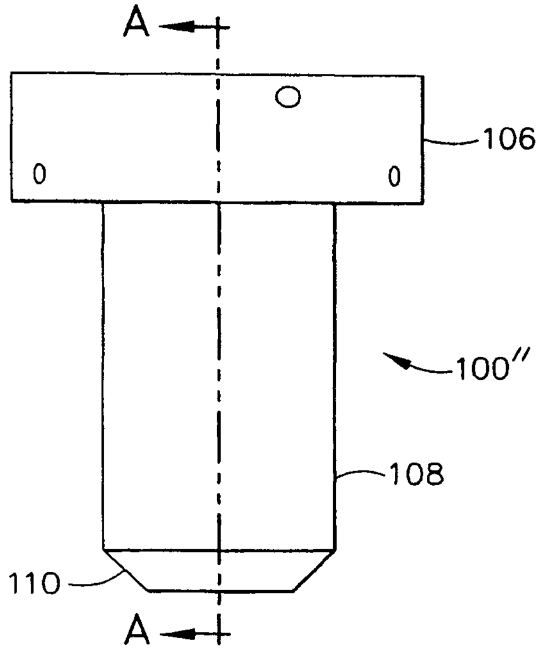
Figure 27:
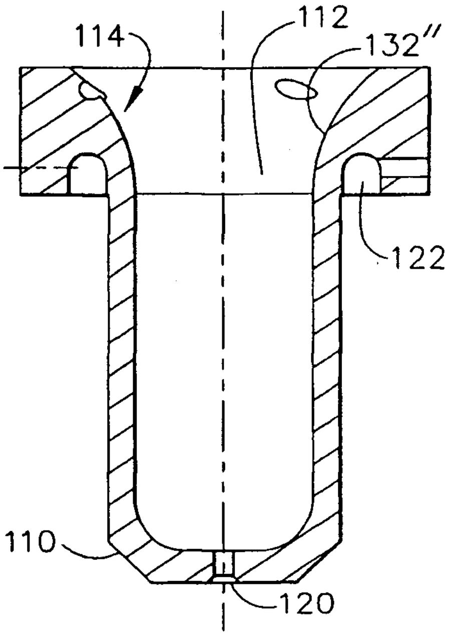
Figure 28:
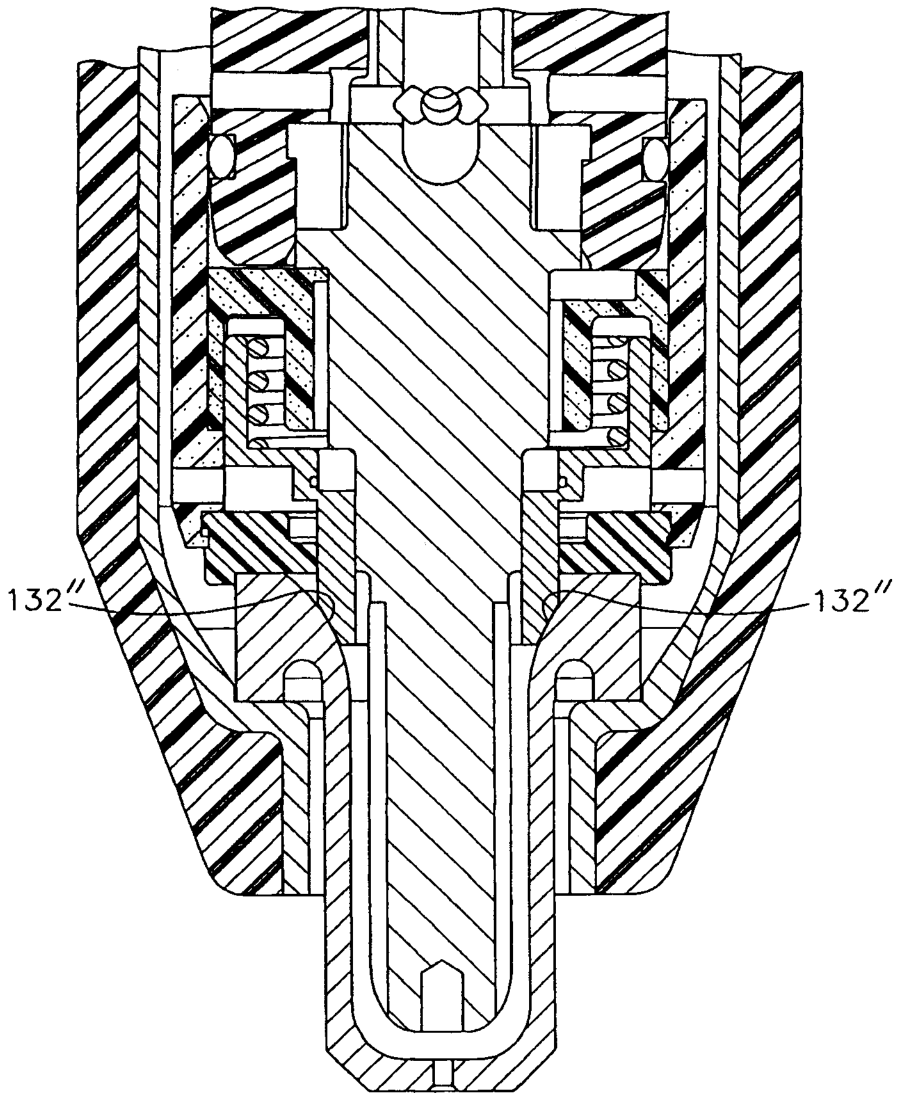
Figure 29:
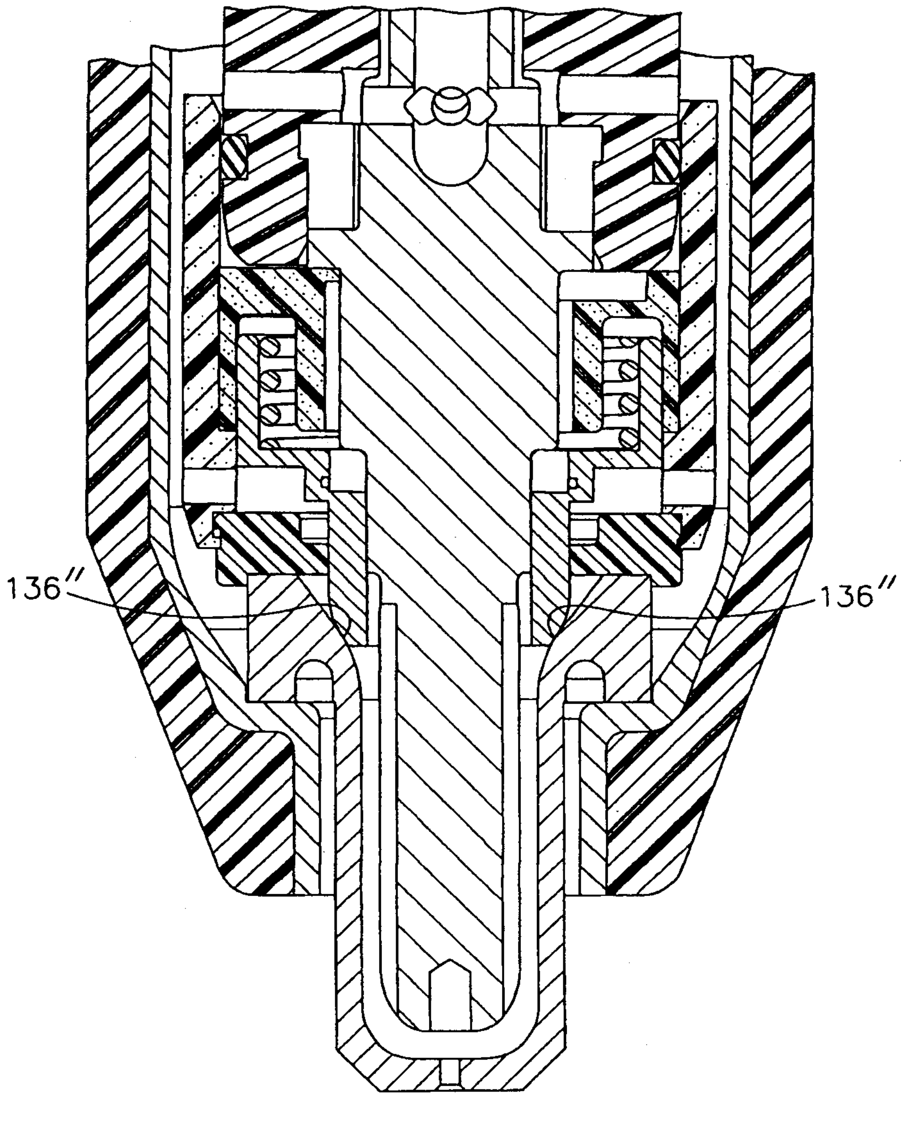

Instead of ridge 132' on the tip 100', as shown in FIG. 24 a ridge 136' could be formed on the contact member of the start cartridge that engages the surface of the proximal section 114 of the space 112 of the tip 100.

A tenth embodiment of a tip for a plasma arc torch is indicated generally as 100' in FIGS. 25–29. Tip 100" is similar to tips 100 and 100', and corresponding parts are identified with corresponding reference numerals. However, instead of ridge 132 on tip 100 or ridge 132' on tip 100', the surface 130" has a convexly curved cross-sectional configuration that engages the contact surface of the start cartridge, forming a small surface area of contact. This small area of contact increases the contact pressure between the tip and the start cartridge.

Instead of surface 130" on the tip 100", as shown in FIG. 34 the surface of the start cartridge can have a convexly curved configuration for engaging the flat surface on the proximal portion 114 of the space 112.

What is claimed is:

1. A tip for a contact start plasma arc torch comprising a generally cylindrical body having a proximal end and a distal end, a generally annular flange at the proximal end of the generally cylindrical body, the tip being generally hollow, with a space extending distally from the proximal end, the space comprising a proximal section of tapering configuration and a central section of generally constant cross section, and a ridge on the proximal section.

2. The tip according to claim 1 wherein the ridge has a generally triangular cross section.

3. The tip according to claim 1 wherein the ridge has generally triangular cross section, with a vertex of the triangle projecting generally outwardly from the surface of the proximal section.

4. The tip according to claim 3 wherein the vertex has an angle of about 90 degrees.

5. The tip according to claim 1 wherein the tip has a semicircular cross section.

6. The tip according to claim 1 wherein proximal section is convexly curved, and wherein the ridge is the crest of a convexly curved surface.

7. In a contact start plasma arc torch of the type comprising a tip and a contact member initially in contact with the tip, the improvement comprising an annular contact between the tip and the contact member formed by a raised ridge on one of the tip or the start member, wherein the tip is hollow, the hollow having a proximal section that is convexly curved, and wherein the ridge is the crest of a convexly curved surface.

* * * * *

UNITED STATES PATENT AND TRADEMARK OFFICE

CERTIFICATE OF CORRECTION

PATENT NO. : 6,933,461 B2
APPLICATION NO. : 10/245781
DATED : August 23, 2005
INVENTOR(S) : Horner-Richardson et al.

It is certified that error appears in the above-identified patent and that said Letters Patent is hereby corrected as shown below:

The Title page showing the illustrative figure should be deleted to be replaced with the attached Title page.

In the drawings, Figs. 1-20 should be replaced with the corrected Figs. 1-20 as shown on the attached pages.

Signed and Sealed this
Twenty-fourth Day of July, 2012

David J. Kappos
*Director of the United States Patent and Trademark Office*

(12) United States Patent
Horner-Richardson et al.

(10) Patent No.: US 6,933,461 B2
(45) Date of Patent: Aug. 23, 2005

(54) TIPS AND CONTACT MEMBERS HAVING RIDGES FOR USE IN A CONTACT START PLASMA ARC TORCH

(75) Inventors: Kevin Horner-Richardson, Cornish, NH (US); David A. Small, Strafford, VT (US); Joseph P. Jones, Lebanon, NH (US); Roger W. Hewitt, Plainfield, NH (US)

(73) Assignee: Thermal Dynamics Corporation, West Lebanon, NH (US)

(*) Notice: Subject to any disclaimer, the term of this patent is extended or adjusted under 35 U.S.C. 154(b) by 0 days.

(21) Appl. No.: 10/245,781

(22) Filed: Sep. 16, 2002

(65) Prior Publication Data

US 2004/0011771 A1 Jan. 22, 2004

Related U.S. Application Data

(63) Continuation-in-part of application No. 10/083,167, filed on Feb. 26, 2002, now Pat. No. 6,774,336, and a continuation-in-part of application No. 09/794,540, filed on Feb. 27, 2001, now Pat. No. 6,703,581.

(51) Int. Cl.[7] .......... B23K 10/00

(52) U.S. Cl. .......... 219/121.48; 219/121.52; 219/121.57; 219/75

(58) Field of Search .......... 219/121.5, 121.52, 219/121.51, 121.54, 121.57, 121.59, 121.48, 74, 75; 313/231.31, 231.41

(56) References Cited

U.S. PATENT DOCUMENTS

| | | | | |
|---|---|---|---|---|
| 4,916,273 A | * | 4/1990 | Browning | 219/121.47 |
| 5,164,568 A | * | 11/1992 | Sanders | 219/121.5 |
| 5,464,961 A | * | 11/1995 | Lichon | 219/121.52 |
| 5,994,663 A | * | 11/1999 | Lu | 219/121.51 |
| 6,372,298 B1 | * | 4/2002 | Marantz et al. | 427/449 |

* cited by examiner

*Primary Examiner*—Mark Paschall
(74) *Attorney, Agent, or Firm*—Harness, Dickey & Pierce, P.L.C.

(57) ABSTRACT

A tip for a plasma arc torch includes a ridge for improved electrical contact with a starting member.

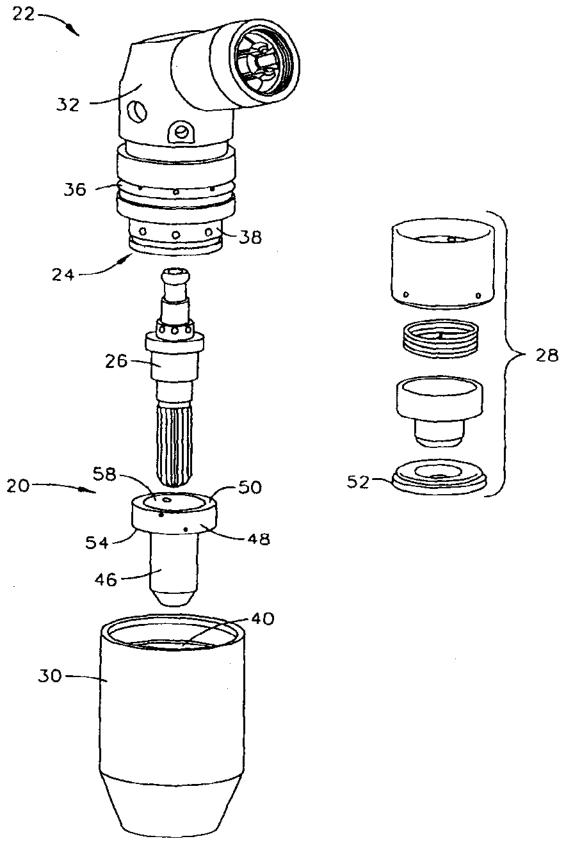

7 Claims, 25 Drawing Sheets